US010581261B2

(12) United States Patent
Martaeng et al.

(10) Patent No.: US 10,581,261 B2
(45) Date of Patent: Mar. 3, 2020

(54) METHODS AND SYSTEM FOR ADD-ON BATTERY

(71) Applicant: Green Cubes Technology Corporation, Kokomo, IN (US)

(72) Inventors: Jesper Martaeng, Lerum (SE); Mohammed Alobaidi, Kokomo, IN (US); Anthony Cooper, Kokomo, IN (US)

(73) Assignee: Green Cubes Technology Corporation, Kokomo, IN (US)

(*) Notice: Subject to any disclaimer, the term of this patent is extended or adjusted under 35 U.S.C. 154(b) by 0 days.

(21) Appl. No.: 15/792,192

(22) Filed: Oct. 24, 2017

(65) Prior Publication Data

US 2018/0048174 A1 Feb. 15, 2018

Related U.S. Application Data

(63) Continuation of application No. 14/630,535, filed on Feb. 24, 2015, now Pat. No. 9,800,071.

(51) Int. Cl.
*H02J 7/00* (2006.01)

(52) U.S. Cl.
CPC .......... *H02J 7/0068* (2013.01); *H02J 7/0054* (2013.01); *H02J 2007/0059* (2013.01)

(58) Field of Classification Search
USPC .......................................................... 320/103
See application file for complete search history.

(56) References Cited

U.S. PATENT DOCUMENTS 8,294,295 B2 10/2012 Xiao
8,410,755 B2 4/2013 Chau
8,513,928 B2 8/2013 Totterman et al.
8,541,905 B2 9/2013 Brabec
8,618,772 B2 12/2013 Thomas et al.
8,629,661 B2 1/2014 Shimada et al.
8,635,037 B2 1/2014 Quet
8,659,272 B2 2/2014 Watanabe et al.
8,836,284 B2 * 9/2014 Takahashi .......... G01R 31/3662 320/104
2008/0036419 A1 * 2/2008 Cook .................... H02J 7/0031 320/104
2008/0046204 A1 * 2/2008 Jungreis ................ H02M 3/337 702/60
2008/0164849 A1 * 7/2008 Ciaramitaro ........ H01M 10/345 320/151
2009/0059622 A1 * 3/2009 Shimada ................ H02M 1/32 363/17
2009/0108767 A1 * 4/2009 Kohno .................. H02M 3/285 315/291
2009/0317696 A1 12/2009 Chang
(Continued)

FOREIGN PATENT DOCUMENTS

WO 2006045016 A3 4/2006

*Primary Examiner* — Samuel Berhanu
(74) *Attorney, Agent, or Firm* — Reichel Stohry Dean LLP; Mark C. Reichel; Natalie J. Dean

(57) ABSTRACT

Systems and methods for operating an add-on battery that may be electrically coupled to a second system that includes an electrical energy storage device are presented. In one example, the systems and methods provide for extending operation of the second system via selectively powering the second system via the add-on battery in response to operating conditions of the second system.

18 Claims, 12 Drawing Sheets

(56) References Cited

U.S. PATENT DOCUMENTS

| | | | | |
|---|---|---|---|---|
| 2010/0277117 | A1 | 11/2010 | Duan | |
| 2011/0025124 | A1* | 2/2011 | Brabec | B60L 11/1861 307/9.1 |
| 2011/0133555 | A1* | 6/2011 | Choi | H02J 3/383 307/65 |
| 2012/0049772 | A1 | 3/2012 | Moussaoui et al. | |
| 2012/0074894 | A1 | 3/2012 | Chen | |
| 2012/0169129 | A1 | 7/2012 | Kim et al. | |
| 2013/0003424 | A1 | 1/2013 | Song et al. | |
| 2013/0044519 | A1* | 2/2013 | Teraura | H02M 3/33584 363/17 |
| 2013/0234669 | A1 | 9/2013 | Huang et al. | |
| 2014/0003095 | A1 | 1/2014 | Thomas et al. | |
| 2014/0009972 | A1* | 1/2014 | Chiang | H02M 3/33584 363/21.04 |
| 2014/0176045 | A1* | 6/2014 | Naskali | H02J 7/0054 320/103 |
| 2014/0354212 | A1 | 12/2014 | Sugeno | |
| 2015/0015181 | A1* | 1/2015 | Kondo | H02M 3/33584 320/103 |

* cited by examiner

DRIVER
DSP/MCU
BMS

METHODS AND SYSTEM FOR ADD-ON BATTERY

PRIORITY

The present application is related to, claims the priority benefit of, and is a U.S. continuation patent application of, U.S. patent application Ser. No. 14/630,535, filed Feb. 24, 2015 and issued as U.S. Pat. No. 9,800,071 on Oct. 24, 2017, the contents of which are incorporated into the present disclosure directly and by reference in their entirety.

FIELD

The present description relates to methods and a system for an add-on battery that may be electrically coupled to an external battery of a system that relies at least partially on power from the external battery. The methods and systems may be particularly useful for systems that operate remotely or untethered from a stationary power grid.

BACKGROUND AND SUMMARY

A system may include electrically operated devices for performing tasks and/or providing enjoyment to a user. For example, a system may comprise, but is not limited to including motors, solenoids, radio receivers, display devices, computers, and cooking appliances. Electrically operated devices in the system may be powered via an electrical energy storage device such as a battery or capacitor when the system is remote or untethered from a stationary power grid. The electrical energy storage device may be adequate for operating the electrically operated devices for a limited amount of time or charge consumption, but the electrical energy storage devices have limited capacity. Consequently, the electrical energy storage device may be periodically returned to the stationary power grid for recharging. Further, the system may be designed to operate with lower charge density energy storage devices (e.g., lead-acid batteries), thereby, potentially increasing the frequency of system charging. Therefore, it may be desirable to increase operating time of a system that is electrically powered via an electrical energy storage device so that less frequent energy storage device charging may be necessary.

The inventors herein have recognized the above-mentioned issue and have developed an add-on battery system, comprising: a battery; a bi-directional DC/DC converter; and a controller including instructions stored in non-transitory or non-volatile memory to direct current flow into the battery and out of the battery via the bi-directional DC/DC converter in response to conditions of an external electrical energy storage device.

By controlling current flow into and out of a battery of an add-on battery system in response to conditions of an external electrical energy storage device via a bi-directional DC/DC converter, it may be possible to extend operating time of the external electrical energy storage device and the external system in which it operates. Further, electrical charge stored in the add-on battery system may be applied to the external system more efficiently. For example, charge from the add-on battery system may only be delivered during some conditions in response to an electrical load being applied to the external electrical energy storage device. In particular, the add-on battery system may only supply electrical power (e.g., current and voltage) when the external electrical energy storage device has a state of charge greater than a threshold and when the external load is consuming power from the external electrical energy storage device. Consequently, the add-on battery system supplies electrical power during conditions when it may be most efficient. Use of add-on battery power may be more efficient when a load is being supplied to the external electrical energy storage device because more electrical power may be applied to the electrical load rather than to less efficient charging of the external electrical energy storage device. Additionally, the bi-directional DC/DC converter allows the add-on battery system to be charged via a charger that charges the external system battery.

The present description may provide several advantages. In particular, the approach may improve efficiency of electrical power transfer from one electrical system to another. In addition, the approach may also provide energy transfer between systems without having to provide large cables between electrical systems. Further, the add-on battery system may be electrically coupled to an external system at any time without having to deactivate the external system. Further still, the add-on battery system may interfere less with fuel gauge displays of the external system.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
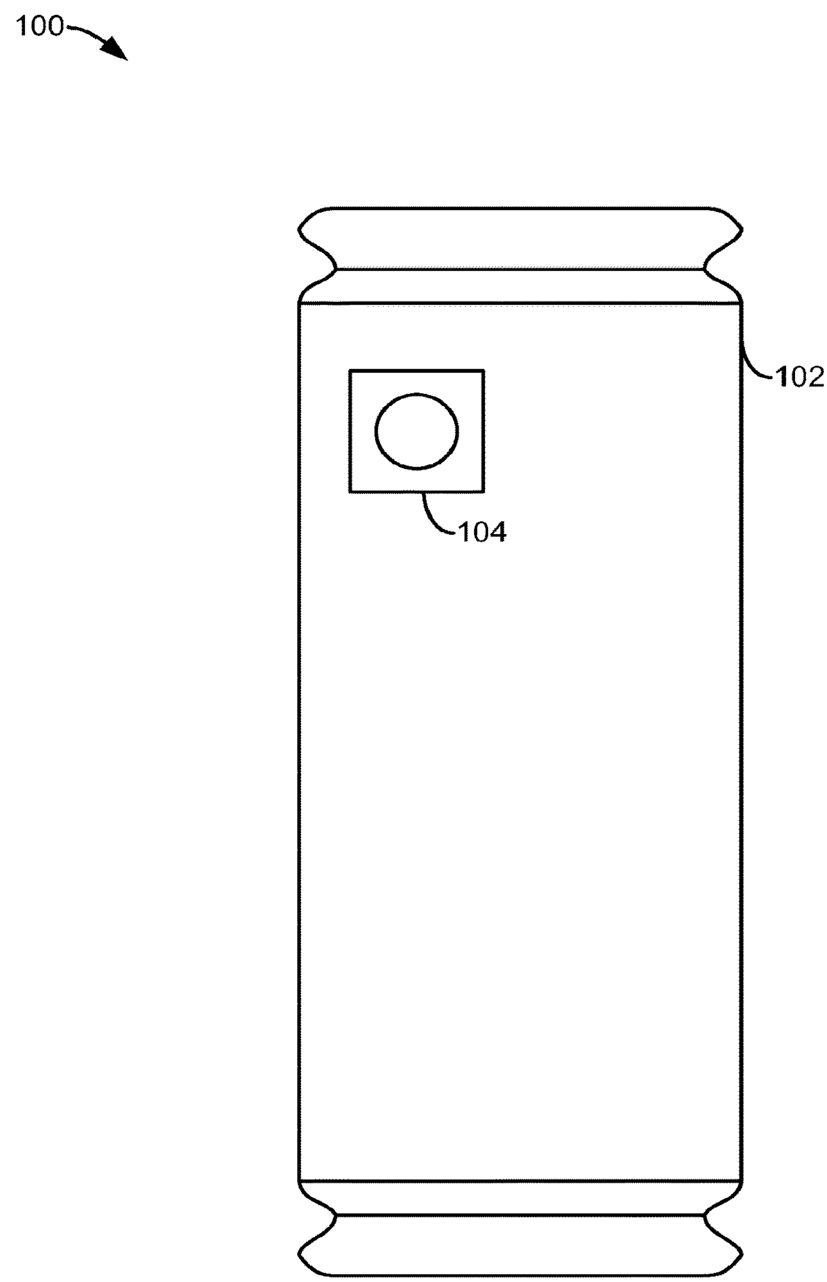
FIG. 1 is a schematic diagram of an add-on battery system.

The present description is related to augmenting electrical power supplied to a system that operates using electrical power supplied via an electrical energy storage device. Electrical power may be provided to the system via an add-on battery system as is shown in FIG. 1. The add-on battery system of FIG. 1 may be applied to systems that operate using electrical power supplied via an electrical energy storage device such as the systems shown in FIGS. 2 and 3. The add-on battery system may include an electrical configuration as is shown in FIG. 4. The add-on battery system may include a bi-directional DC/DC converter that operates as is shown in FIGS. 5-8. The add-on battery system may be operated according to the method of FIGS. 9-15.

Referring now to FIG. 1, a plan view of add-on battery system 100 is shown. Add-on battery system 100 is shown including a case 102 and electrical connector 104. In some examples, case 102 may include a carry handle (not shown) for transporting the add-on battery to a remote location where stationary grid power is out of range or to systems that change location frequently. Electrical connector 104 may provide electrical coupling between add-on battery system 100 and an external system that is powered via an electrical energy storage device (not shown). In some examples, add-on battery system 100 may include a plurality of electrical connectors. An external system in context of this disclosure refers to a system that is not part of the add-on battery system. An external electrical energy storage device refers to an electrical energy storage device that is not part of the add-on battery system.

Figure 2:
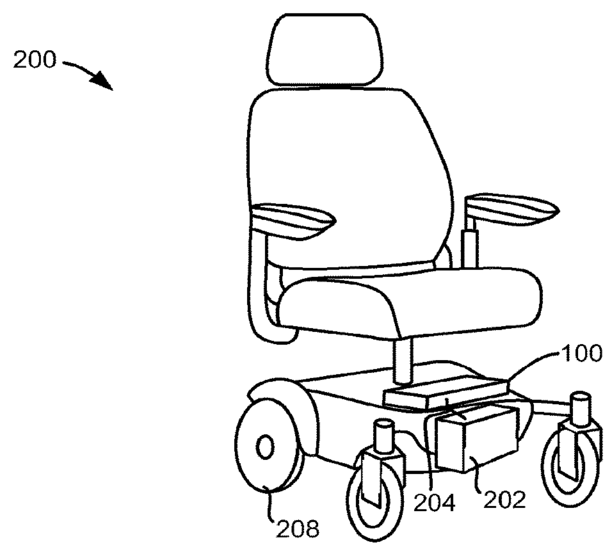
FIGS. 2 and 3 are schematic diagrams of example systems that may benefit from the add-on battery system of FIG. 1.

Referring now to FIG. 2, a schematic view of a powered chair 200 is shown. Powered chair 200 may propel an occupant (not shown) to a desired location. Powered chair 200 includes a battery 202 for supplying electrical power to a motor that is mechanically coupled to wheels 208. Add-on battery system 100 is shown electrically coupled to battery 202 via cable 204. Add-on battery system 100 supplies electrical power to the motor (not shown) when the motor is activated. In some examples, add-on battery system 100 does not charge battery 202 when the motor is not activated unless charge of battery 202 is determined to be less than a threshold level. By supplying a greater percentage of charge from add-on battery system 100 to the motor (not shown) rather than battery 202, charge supplied by add-on battery system 100 may be used more efficiently, thereby conserving charge of battery 202. Thus, an operating range of powered chair 200 may be increased via electrically coupling add-on battery system 100 to battery 202.

Figure 3:
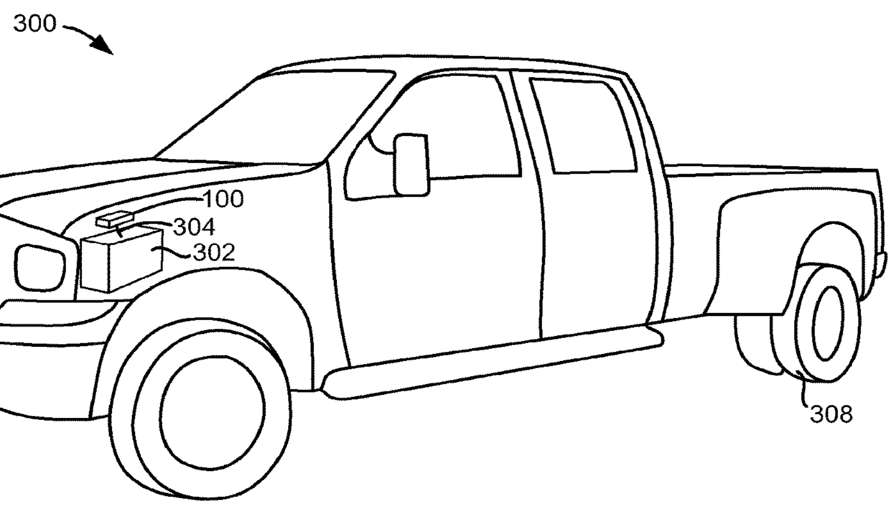
Figure 4:
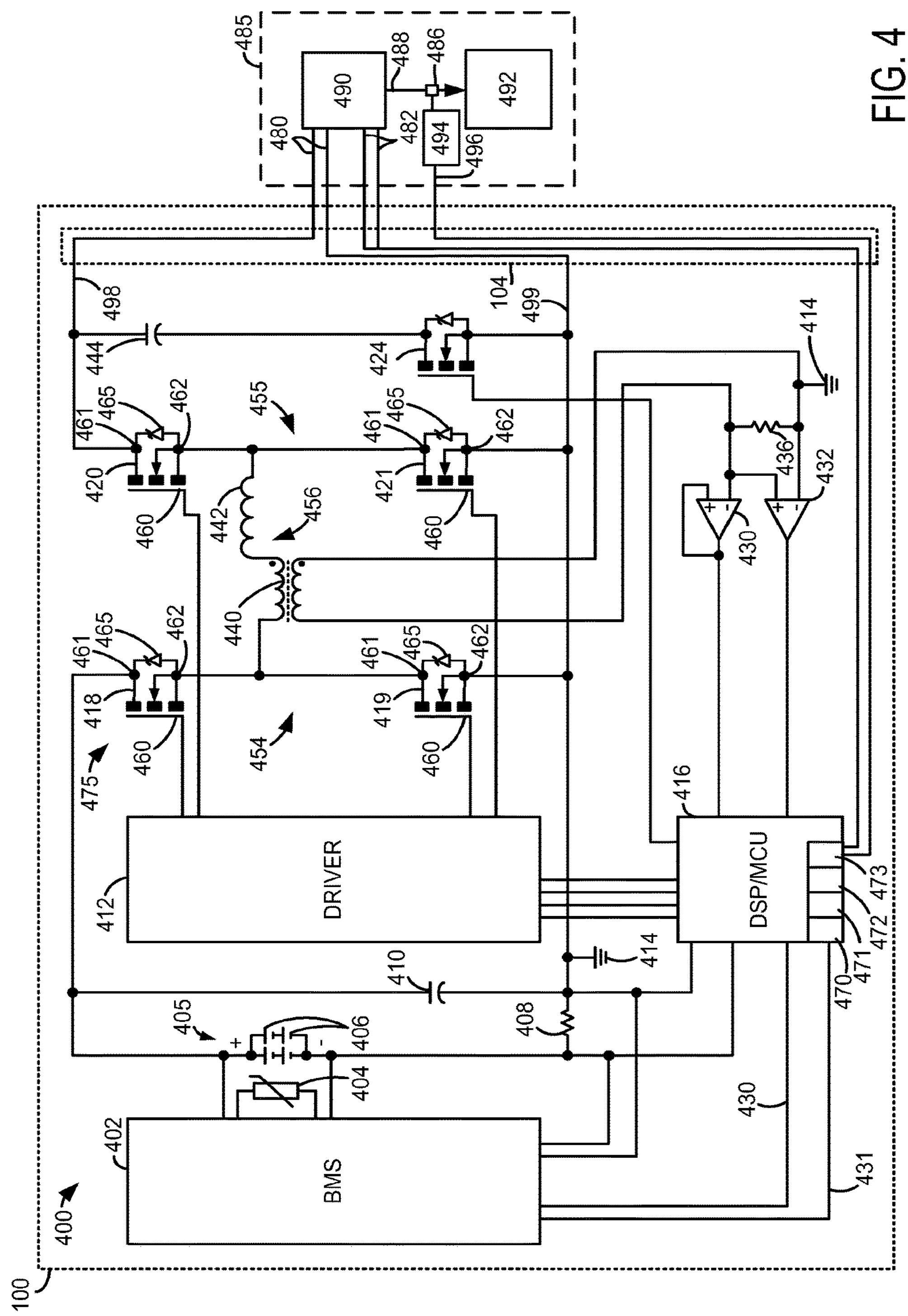
FIG. 4 is a high level example electrical schematic of an example add-on battery system.

Referring now to FIG. 3, a schematic view of a vehicle 300 is shown. Vehicle 300 may deliver an occupant (not shown) to a desired location. Vehicle 300 includes a battery 302 for supplying electrical power to a motor that is mechanically coupled to wheels 308. Alternatively, battery 302 may supply electrical power to a starter motor (not shown) for rotating an engine (not shown). Add-on battery system 100 is shown electrically coupled to battery 302 via cable 304. Add-on battery system 100 supplies electrical power to the motor (not shown) or starter (not shown) when the motor or starter is activated. Alternatively, if charge of battery 302 is less than a threshold, add-on battery system 100 may supply charge to battery 302 so that battery 302 may supply a higher level of current to the starter motor (not shown) at a later time after battery 302 is charged. Add-on battery system 100 does not charge battery 302 when the motor or starter motor is not activated unless charge of battery 302 is determined to be less than a threshold level. By supplying a greater percentage of charge from add-on battery system 100 to the motor (not shown) rather than battery 302, charge supplied by add-on battery system 100 may be used more efficiently and charge of battery 302 may be conserved. However, when charge of battery 302 is low, add-on battery system 100 may charge battery 302 to ensure battery 302 may supply higher current levels to the motor or starter motor than that which may be provided solely via add-on battery system 100. Thus, add-on battery system 100 may improve the possibility of engine starting via a starter motor. Further, add-on battery system 100 may increase the operating range of vehicle 300 when vehicle 300 is propelled via a motor by electrically coupling add-on battery system 100 to battery 302.

It should be noted that powered chair 200 and vehicle 300 are only two example systems that may be assisted via add-on battery system 100. The scope of systems that add-on battery system 100 may assist is not limited to powered chair 200 and vehicle 300. For example, add-on battery system may be applied to battery powered cooking appliances, all types of battery powered vehicles including manned and unmanned battery powered vehicles, radios, displays, computers, motors, solenoids, and any other type of battery powered device.

Referring now to FIG. 4, a high level electrical schematic of an example add-on battery electrical system is shown. The electrical system 400 of FIG. 4 may be incorporated into the add-on battery system 100 shown in FIG. 1. In other words, the electrical system 400 of FIG. 4 may be a sub-system of the add-on battery system 100 of FIG. 1. Further, the electrical system 400 of FIG. 4 may provide the operating sequences of FIGS. 5-8, and the electrical system 400 of FIG. 4 may include the method of FIGS. 9-15 stored in non-transitory memory. Additionally, FIG. 4 is only one example of an electrical system described by Applicant's claims. Further systems and methods derived from or made obvious from Applicant's specification and provided by one skilled in the art are also within the scope of this specification.

Add-on battery system 100 includes electrical system 400. Components of electrical system 400 are shown within the dotted line indicating the bounds of add-on battery system 100. Electrical system 400 includes a battery cell management system (BMS) 402. BMS 402 includes electronics for sensing and/or inferring voltage, temperature, battery current, and battery state of charge of battery 405. If charge of one or more battery cells 406 is greater than desired, BMS 402 may discharge one or more of battery cells 406 into variable resistor 404, thereby, balancing charge within battery 405. BMS 402 may provide an indication to add-on battery system controller 416 that battery 405 is in condition for discharging via conductor 430. BMS 402 may also provide an indication to add-on battery system controller 416 that battery 405 is in condition for charging via conductor 431. Battery 405 may be comprised of one or more battery cells 406. Battery cells 406 may be arranged in series and parallel to increase battery voltage and charge capacity. Battery 405 may be charged or discharged via H-bridge 475. Capacitor 410 filters output of battery 405.

Add-on battery system controller 416 includes a central processing unit or digital signal processing unit 470, random-access memory 471, read-only or non-transitory memory 472, and inputs/outputs 473. Add-on battery system controller 416 receives charge and discharge current from operational amplifiers 430 and 432. Add-on battery system controller 416 sends H-bridge control signals to metal oxide semiconductor field effect transistor (MOSFET) driver 412. Further, add-on battery system controller 416 may receive battery current and battery voltage information from external battery operated system 485 via a controller area network (CAN) 496 and/or isolated analog channels 482. Central processing unit or digital signal processing unit 470 may execute instructions representing the method of FIGS. 9-15. The executable instructions of FIGS. 9-15 may be stored in non-transitory memory 472.

MOSFET driver 412 includes devices for sourcing current and voltage sufficient for driving MOSFETS 418-421. MOSFET driver 412 receives H-bridge control signals from add-on battery system controller 416. H-bridge 475 is comprised of MOSFETS 418-421, transformer 440, and inductor 442 arranged in vertical and horizontal circuits forming a H shape. Each of MOSFETS 418-421 are shown as N-channel MOSFETS, but P-channel MOSFETS or other switching devices may be substituted for MOSFETS 418-421 in other examples. MOSETS 418-421 include drains 461, gates 460, and sources 462. Shottky diodes 465 are shown in parallel with MOSFETS 418-421. A first vertical leg circuit 454 of H-bridge 475 is formed by electrically coupling source 462 of MOSFET 418 to drain of MOSFET 419. A second vertical leg circuit 455 of H-bridge 475 is formed by electrically coupling source 462 of MOSFET 420 to drain of MOSFET 421. Sources of MOSFET 419 and MOSFET 421 are electrically coupled to the low potential side of battery 405. Drains of MOSFET 418 and MOSFET 420 are electrically coupled to the high potential side of battery 405. The horizontal leg circuit 456 electrically couples first 454 and second 455 vertical legs. Horizontal leg circuit 456 includes transformer 440 and inductor 442. Transformer 440 is electrically coupled to operational amplifiers 430 and 432, thereby providing feedback of inductor current to add-on battery system controller 416. Resistor 436 electrically couples inverting inputs of operational amplifiers 430 and 432. H-bridge output or input (e.g., current and voltage), input/output depending on control of H-bridge MOSFETS, is applied to electrical connector 104 via conductors 498 and 499. MOSFET 424 may be selectively activated to filter H-bridge output via capacitor 444. MOSFET 418 may be referred to as transistor Q1. MOSFET 419 may be referred to as transistor Q2. MOSFET 420 may be referred to as transistor Q3. MOSFET 421 may be referred to as transistor Q4. The low potential side of battery 405 is electrically coupled to ground 414 via resistor 408.

Add-on battery system 100 is shown in electrical communication with external system 485 via electrical connector 104. External system 485 may include an external electrical energy storage device (e.g., a battery) 490 and an electrical load 492. Electrical load 492 may be comprised of a motor, display, electrical actuator, or other electrical load. However, in some examples, electrical load 492 may operate in some modes as a generator supplying charge to external energy storage device 490. In some examples, current sensor 486 may indicate current flow between external electrical energy storage device 490 and electrical load 492 via conductor 488. Current information from electrical energy storage device 490 to electrical load 492 may delivered to add-on battery system 100 via CAN 496. Controller 494 may process current data from sensor 486 and output the data via CAN 496. Conductors 480 may electrically couple 1H-bridge 475 and electrical energy storage device 490. Voltage of external electrical energy storage device 490 may be supplied to add-on battery system controller 416 via conductors 482.

H-bridge 475 may operate supplying current to external electrical energy storage device 490 from battery 405. Alternatively, H-bridge 475 may operate supplying current to battery 405 from external electrical energy storage device 490. Thus, H-bridge 475 provides bi-directional power flow. Further, H-bridge 475 may be operated in buck or boost modes depending on the voltage difference and the direction of current flow between external electrical energy storage device 490 and battery 405.

Thus, the system of FIGS. 1-4 provides for an add-on battery system, comprising: a battery; a bi-directional DC/DC converter; and a controller including instructions stored in non-transitory memory to direct current flow into the battery and out of the battery via the bi-directional DC/DC converter in response to conditions of an external electrical energy storage device. The add-on battery system further comprises additional instructions to activate the bi-directional DC/DC converter in response to a derivative of an external electrical energy storage device voltage. The add-on battery system further comprises additional instructions to activate the bi-directional DC/DC converter in response to an error between a rolling average of an external electrical energy storage device voltage and an instantaneous external electrical energy storage device voltage.

In some examples, the add-on battery system includes where the bi-directional DC/DC converter includes an H-bridge comprising a transformer positioned in a horizontal circuit extending between two vertical circuits. The add-on battery system includes where the two vertical circuits are comprised of metal oxide semiconductor field effect transistors. The add-on battery system includes where the horizontal circuit further comprises an inductor. The add-on battery system further comprises additional instructions to deactivate the bi-directional DC/DC converter in response to a voltage of an external electrical energy storage device being less than a first threshold and being greater than a second threshold. The add-on battery system further comprises additional instructions to activate the bi-directional DC/DC converter in response to the voltage of the external electrical energy storage device being greater than the first threshold and being less than the second threshold.

Figure 5:
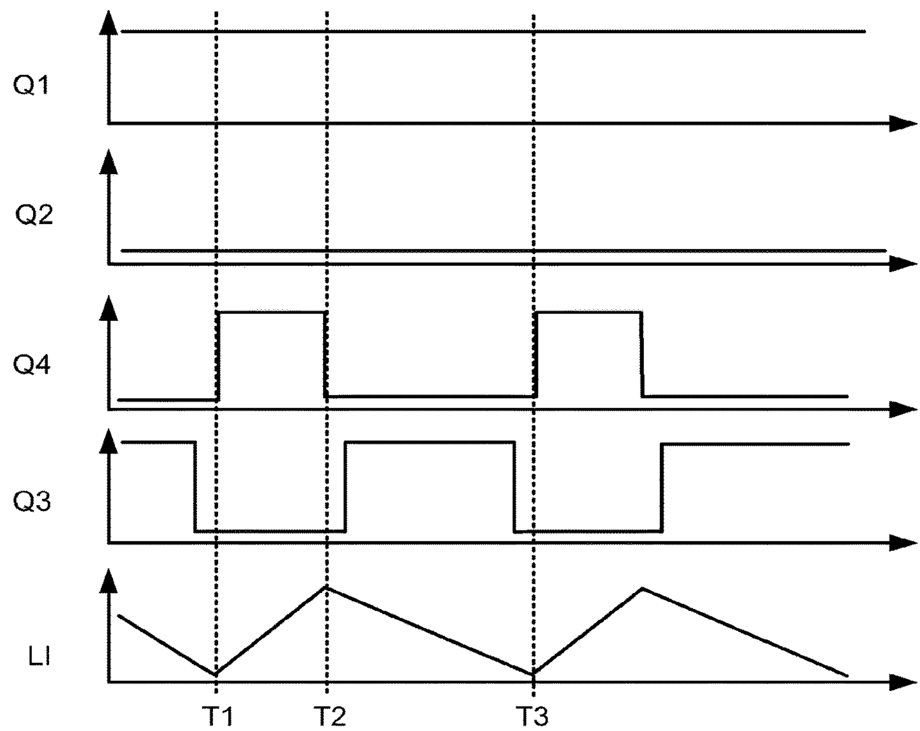
FIGS. 5-8 are plots showing signals of interest in different operational modes of a bi-directional DC\DC converter included in the example add-on battery system.

Referring now to FIG. 5, an operating sequence for a bi-directional H-bridge supplying charge from an add-on battery system battery to an external electrical energy storage device is shown. The sequence of FIG. 5 may be provided by the H-bridge of FIG. 4 according to the method of FIGS. 9-15. Times of interest in the sequence are indicated via vertical markers T1-T3. The sequence of FIG. 5 applies when voltage of the add-on battery system battery voltage is lower than voltage of the external electrical energy storage device. This mode may be referred to as a boost mode.

The first plot from the top of FIG. 5 is a plot of voltage applied to a gate of MOSFET Q1 of FIG. 4 versus. MOSFET Q1 conducts and allows current to flow between the drain and source of Q1 when the voltage applied to the gate of MOSFET Q1 is a higher value. Voltage applied to the gate of MOSFET Q1 increases in the direction of the vertical axis arrow. Voltage applied to the gate of MOSFET Q1 is near ground potential near the horizontal axis. MOSFET Q1 does not conduct and current does not flow from the drain to source of MOSFET Q1 when the voltage applied to the gate of MOSFET Q1 is near ground potential. The horizontal axis represents time and time increases from the left side of the plot to the right side of the plot.

The second plot from the top of FIG. 5 is a plot of voltage applied to a gate of MOSFET Q2 of FIG. 4 versus time. MOSFET Q2 conducts and allows current to flow between the drain and source of Q2 when the voltage applied to the gate of MOSFET Q2 is a higher value. Voltage applied to the gate of MOSFET Q2 increases in the direction of the vertical axis arrow. Voltage applied to the gate of MOSFET Q2 is near ground potential near the horizontal axis. MOSFET Q2 does not conduct and current does not flow from the drain to source of MOSFET Q2 when the voltage applied to the gate of MOSFET Q2 is near ground potential. The horizontal axis represents time and time increases from the left side of the plot to the right side of the plot.

The third from the top of FIG. 5 is a plot of voltage applied to a gate of MOSFET Q4 of FIG. 4 versus time.

MOSFET Q4 conducts and allows current to flow between the drain and source of Q4 when the voltage applied to the gate of MOSFET Q4 is a higher value. Voltage applied to the gate of MOSFET Q4 increases in the direction of the vertical axis arrow. Voltage applied to the gate of MOSFET Q4 is near ground potential near the horizontal axis. MOSFET Q4 does not conduct and current does not flow from the drain to source of MOSFET Q4 when the voltage applied to the gate of MOSFET Q4 is near ground potential. The horizontal axis represents time and time increases from the left side of the plot to the right side of the plot.

The fourth plot from the top of FIG. 5 is a plot of voltage applied to a gate of MOSFET Q3 of FIG. 4 versus time. MOSFET Q3 conducts and allows current to flow between the drain and source of Q3 when the voltage applied to the gate of MOSFET Q3 is a higher value. Voltage applied to the gate of MOSFET Q3 increases in the direction of the vertical axis arrow. Voltage applied to the gate of MOSFET Q3 is near ground potential near the horizontal axis. MOSFET Q3 does not conduct and current does not flow from the drain to source of MOSFET Q3 when the voltage applied to the gate of MOSFET Q3 is near ground potential. The horizontal axis represents time and time increases from the left side of the plot to the right side of the plot.

The fifth plot from the top of FIG. 5 is a plot of I-H-bridge inductor current (e.g., 442 of FIG. 4) versus time. The H-bridge inductor current is based on the operating states of MOSFETS Q1-Q4. Inductor current increases in the direction of the vertical axis arrow. Inductor current is near zero at the horizontal axis. The horizontal axis represents time and time increases from the left side of the plot to the right side of the plot.

At time T1, voltage applied to the gate of Q1 is a high level so Q1 conducts. The voltage applied to the gate of Q2 is a low level so Q2 does not conduct. The voltage applied to Q4 transitions from a low level to a high level so that Q4 begins to conduct. The voltage applied to Q3 is at a low level so Q3 is not conducting at time T1. Inductor current L1 begins to increase when Q4 begins to conduct because current flows from the add-on battery system battery to the H-bridge inductor. Current may flow into the inductor for a predetermined amount of time or until a specified current flow into the inductor is achieved. The amount of current flowing into the inductor determines the amount of energy stored in the inductor.

At time T2, voltage applied to the gate of Q1 remains at a high level so Q1 conducts. The voltage applied to the gate of Q2 also remains at a low level so Q2 does not conduct. The voltage applied to Q4 transitions from the higher level to the lower level so that Q4 stops conducting. The voltage applied to Q3 is at a low level so Q3 is not conducting at time T2, but it transitions to a higher level shortly thereafter so that Q3 begins to conduct. Inductor current LI begins to decrease in response to Q4 being turned off and Q3 being turned on. Energy stored in a field of the inductor is released to the external electrical energy storage device when Q3 begins to conduct. The voltage on the side of the inductor closest to the external electrical energy storage device is increased to a level greater than that of the add-on battery system's battery because, referenced to ground, the inductor voltage includes the add-on battery system's battery voltage plus the inductor's voltage which may be expressed as:

$$V = L \cdot \frac{di}{dt},$$

where V is voltage across the injector, L is the inductor's inductance, i is current, and t is time. Thus, Q3 is activated shortly after Q4 is deactivated so that the transistors are operated sequentially (e.g., one after the other).

Just before time T3, voltage applied to the gate of Q1 is a high level so Q1 conducts. The voltage applied to the gate of Q2 is a low level so Q2 does not conduct. The voltage applied to Q4 is at a low level so Q4 does not conduct. The voltage applied to Q3 transitions to a low level so Q3 stops conducting and the inductor stops discharging. At time T3, Q4 is reactivated by applying a higher voltage to the gate of Q4 and the sequence resumes similar as the sequence began at time T1.

In this way, charge stored in the add-on battery system may be transferred to the external electrical energy storage device. Further, charge may be transferred from the add-on battery system even though battery voltage of the add-on system is lower than battery voltage of the external electrical energy storage device.

Figure 6:
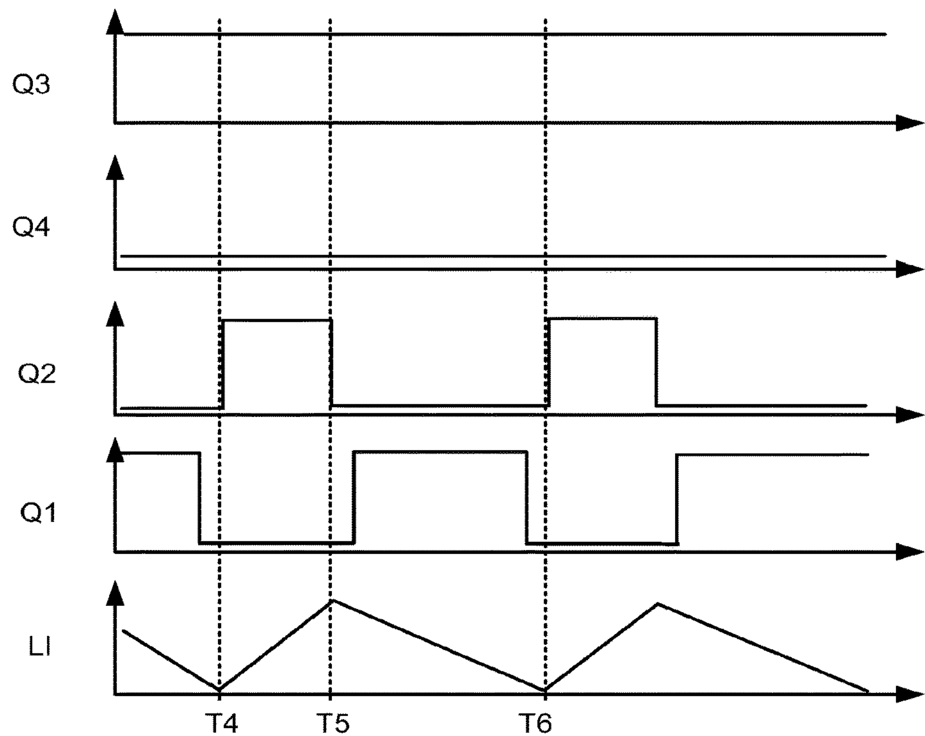

Referring now to FIG. 6, an operating sequence for a bi-directional H-bridge supplying charge from an external electrical energy storage device to an add-on battery system battery is shown. The sequence of FIG. 6 may be provided by the H-bridge of FIG. 4 according to the method of FIGS. 9-15. Times of interest in the sequence are indicated via vertical markers T4-T6. The sequence of FIG. 6 applies when voltage of the add-on battery system battery voltage is higher than voltage of the external electrical energy storage device. This mode may be referred to as a boost mode.

The first plot from the top of FIG. 6 is a plot of voltage applied to a gate of MOSFET Q3 of FIG. 4 versus. MOSFET Q3 conducts and allows current to flow between the drain and source of Q3 when the voltage applied to the gate of MOSFET Q3 is a higher value. Voltage applied to the gate of MOSFET Q3 increases in the direction of the vertical axis arrow. Voltage applied to the gate of MOSFET Q3 is near ground potential near the horizontal axis. MOSFET Q3 does not conduct and current does not flow from the drain to source of MOSFET Q3 when the voltage applied to the gate of MOSFET Q3 is near ground potential. The horizontal axis represents time and time increases from the left side of the plot to the right side of the plot.

The second plot from the top of FIG. 6 is a plot of voltage applied to a gate of MOSFET Q4 of FIG. 4 versus time. MOSFET Q4 conducts and allows current to flow between the drain and source of Q4 when the voltage applied to the gate of MOSFET Q4 is a higher value. Voltage applied to the gate of MOSFET Q4 increases in the direction of the vertical axis arrow. Voltage applied to the gate of MOSFET Q4 is near ground potential near the horizontal axis. MOSFET Q4 does not conduct and current does not flow from the drain to source of MOSFET Q4 when the voltage applied to the gate of MOSFET Q4 is near ground potential. The horizontal axis represents time and time increases from the left side of the plot to the right side of the plot.

The third from the top of FIG. 6 is a plot of voltage applied to a gate of MOSFET Q2 of FIG. 4 versus time. MOSFET Q2 conducts and allows current to flow between the drain and source of Q2 when the voltage applied to the gate of MOSFET Q2 is a higher value. Voltage applied to the gate of MOSFET Q2 increases in the direction of the vertical axis arrow. Voltage applied to the gate of MOSFET Q2 is near ground potential near the horizontal axis. MOSFET Q2 does not conduct and current does not flow from the drain to source of MOSFET Q2 when the voltage applied to the gate of MOSFET Q2 is near ground potential. The horizontal axis represents time and time increases from the left side of the plot to the right side of the plot.

The fourth plot from the top of FIG. 6 is a plot of voltage applied to a gate of MOSFET Q1 of FIG. 4 versus time. MOSFET Q1 conducts and allows current to flow between the drain and source of Q1 when the voltage applied to the gate of MOSFET Q1 is a higher value. Voltage applied to the gate of MOSFET Q1 increases in the direction of the vertical axis arrow. Voltage applied to the gate of MOSFET Q1 is near ground potential near the horizontal axis. MOSFET Q1 does not conduct and current does not flow from the drain to source of MOSFET Q1 when the voltage applied to the gate of MOSFET Q1 is near ground potential. The horizontal axis represents time and time increases from the left side of the plot to the right side of the plot.

The fifth plot from the top of FIG. 6 is a plot of H-bridge inductor current (e.g., 442 of FIG. 4) versus time. The H-bridge inductor current is based on the operating states of MOSFETS Q1-Q4. Inductor current increases in the direction of the vertical axis arrow. Inductor current is near zero at the horizontal axis. The horizontal axis represents time and time increases from the left side of the plot to the right side of the plot.

At time T4, voltage applied to the gate of Q3 is a high level so Q3 conducts. The voltage applied to the gate of Q4 is a low level so Q4 does not conduct. The voltage applied to Q2 transitions from a low level to a high level so that Q2 begins to conduct. The voltage applied to Q1 is at a low level so Q1 is not conducting at time T1. Inductor current LI begins to increase when Q2 begins to conduct because current flows from the external electrical energy storage device to the H-bridge inductor. Current may flow into the inductor for a predetermined amount of time or until a specified current flow into the inductor is achieved. The amount of current flowing into the inductor determines the amount of energy stored in the inductor.

At time T5, voltage applied to the gate of Q3 remains at a high level so Q3 conducts. The voltage applied to the gate of Q4 also remains at a low level so Q4 does not conduct. The voltage applied to Q2 transitions from the higher level to the lower level so that Q2 stops conducting. The voltage applied to Q1 is at a low level so Q1 is not conducting at time T5, but it transitions to a higher level shortly thereafter so that Q1 begins to conduct. Inductor current LI begins to decrease in response to Q2 being turned off and Q1 being turned on. Energy stored in a field of the inductor is released to the add-on battery system battery when Q1 begins to conduct. The voltage on the side of the inductor closest to the add-on battery system battery is increased to a level greater than that of the external electrical energy storage device because the inductor voltage includes the external electrical energy storage device's voltage plus the inductor's voltage. Thus, Q1 is activated shortly after Q2 is deactivated so that the transistors are operated sequentially (e.g., one after the other).

Just before time T6, voltage applied to the gate of Q3 is a high level so Q3 conducts. The voltage applied to the gate of Q4 is a low level so Q4 does not conduct. The voltage applied to Q2 is at a low level so Q2 does not conduct. The voltage applied to Q1 transitions to a low level so Q1 stops conducting and the inductor stops discharging. At time T6, Q2 is reactivated by applying a higher voltage to the gate of Q2 and the sequence resumes similar as the sequence began at time T4.

In this way, charge stored in the external electrical energy storage device may be transferred to the add-on battery system. Further, charge may be transferred from the external electrical energy storage device even though battery voltage of the external electrical energy storage device is lower than battery voltage of the add-on battery system.

Figure 7:
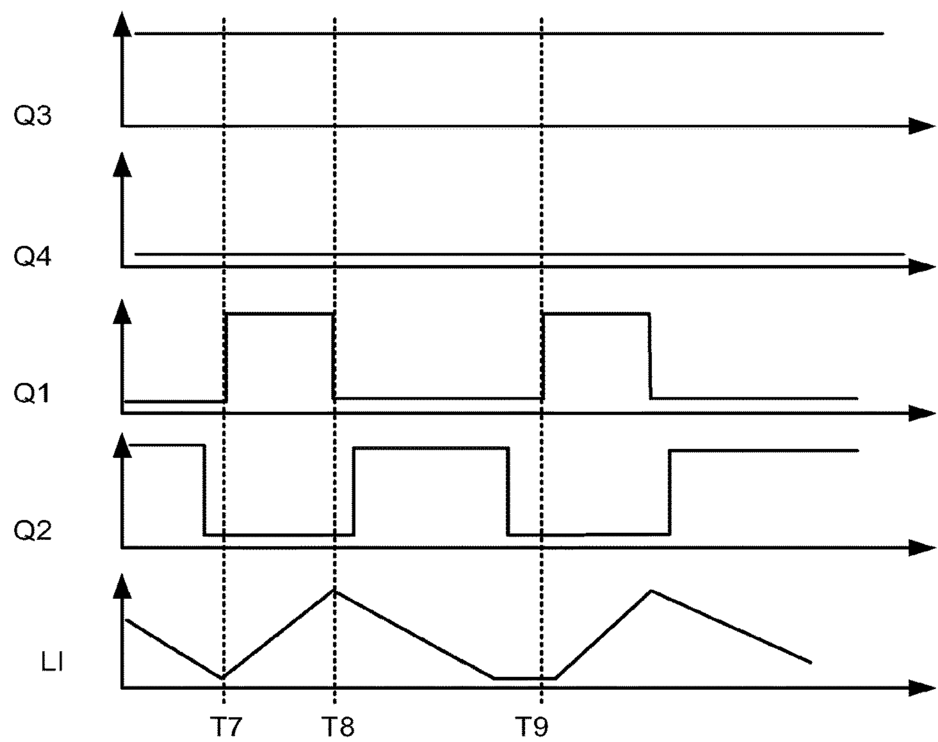

Referring now to FIG. 7, an operating sequence for a bi-directional H-bridge supplying charge from an add-on battery system battery to an external electrical energy storage device is shown. The sequence of FIG. 7 may be provided by the H-bridge of FIG. 4 according to the method of FIGS. 9-15. Times of interest in the sequence are indicated via vertical markers T7-T9. The sequence of FIG. 7 applies when voltage of the add-on battery system battery voltage is higher than voltage of the external electrical energy storage device. This mode may be referred to as a buck mode.

The first plot from the top of FIG. 7 is a plot of voltage applied to a gate of MOSFET Q3 of FIG. 4 versus. MOSFET Q3 conducts and allows current to flow between the drain and source of Q3 when the voltage applied to the gate of MOSFET Q3 is a higher value. Voltage applied to the gate of MOSFET Q3 increases in the direction of the vertical axis arrow. Voltage applied to the gate of MOSFET Q3 is near ground potential near the horizontal axis. MOSFET Q3 does not conduct and current does not flow from the drain to source of MOSFET Q3 when the voltage applied to the gate of MOSFET Q3 is near ground potential. The horizontal axis represents time and time increases from the left side of the plot to the right side of the plot.

The second plot from the top of FIG. 7 is a plot of voltage applied to a gate of MOSFET Q4 of FIG. 4 versus time. MOSFET Q4 conducts and allows current to flow between the drain and source of Q4 when the voltage applied to the gate of MOSFET Q4 is a higher value. Voltage applied to the gate of MOSFET Q4 increases in the direction of the vertical axis arrow. Voltage applied to the gate of MOSFET Q4 is near ground potential near the horizontal axis. MOSFET Q4 does not conduct and current does not flow from the drain to source of MOSFET Q4 when the voltage applied to the gate of MOSFET Q4 is near ground potential. The horizontal axis represents time and time increases from the left side of the plot to the right side of the plot.

The third from the top of FIG. 7 is a plot of voltage applied to a gate of MOSFET Q1 of FIG. 4 versus time. MOSFET Q1 conducts and allows current to flow between the drain and source of Q1 when the voltage applied to the gate of MOSFET Q1 is a higher value. Voltage applied to the gate of MOSFET Q1 increases in the direction of the vertical axis arrow. Voltage applied to the gate of MOSFET Q1 is near ground potential near the horizontal axis. MOSFET Q1 does not conduct and current does not flow from the drain to source of MOSFET Q1 when the voltage applied to the gate of MOSFET Q1 is near ground potential. The horizontal axis represents time and time increases from the left side of the plot to the right side of the plot.

The fourth plot from the top of FIG. 7 is a plot of voltage applied to a gate of MOSFET Q2 of FIG. 4 versus time. MOSFET Q2 conducts and allows current to flow between the drain and source of Q2 when the voltage applied to the gate of MOSFET Q2 is a higher value. Voltage applied to the gate of MOSFET Q2 increases in the direction of the vertical axis arrow. Voltage applied to the gate of MOSFET Q2 is near ground potential near the horizontal axis. MOSFET Q2 does not conduct and current does not flow from the drain to source of MOSFET Q2 when the voltage applied to the gate of MOSFET Q2 is near ground potential. The horizontal axis represents time and time increases from the left side of the plot to the right side of the plot.

The fifth plot from the top of FIG. 7 is a plot of H-bridge inductor current (e.g., 442 of FIG. 4) versus time. The H-bridge inductor current is based on the operating states of MOSFETS Q1-Q4. Inductor current increases in the direction of the vertical axis arrow. Inductor current is near zero at the horizontal axis. The horizontal axis represents time and time increases from the left side of the plot to the right side of the plot.

At time T7, voltage applied to the gate of Q3 is a high level so Q3 conducts. The voltage applied to the gate of Q4 is a low level so Q4 does not conduct. The voltage applied to Q1 transitions from a low level to a high level so that Q1 begins to conduct. The voltage applied to Q2 is at a low level so Q2 is not conducting at time T7. Inductor current LI begins to increase when Q1 begins to conduct because current flows from the add-on battery system battery to the H-bridge inductor. The increasing inductor current induces an opposing voltage in the inductor, the opposing voltage being less than the source voltage (e.g., the add-on battery system battery voltage). Current may flow into the inductor for a predetermined amount of time or until a specified current flow into the inductor is achieved. The amount of current flowing into the inductor determines the amount of energy stored in the inductor.

At time T8, voltage applied to the gate of Q3 remains at a high level so Q3 conducts. The voltage applied to the gate of Q4 remains at a low level so Q4 does not conduct. The voltage applied to Q1 transitions from the higher level to the lower level so that Q1 stops conducting, but the inductor remains electrically coupled to the external electrical energy storage device instead of remaining coupled to the add-on battery system battery as in the case of boost mode. The voltage applied to Q2 is at a low level so Q2 is not conducting at time T8, but it transitions to a higher level shortly thereafter so that Q2 begins to conduct. Inductor current LI begins to decrease in response to Q1 being turned off and Q2 being turned on. Energy stored in a field of the inductor is released to the external electrical energy storage device when Q2 begins to conduct. Thus, Q2 is activated shortly after Q1 is deactivated so that the transistors are operated sequentially (e.g., one after the other).

Just before time T9, voltage applied to the gate of Q3 is a high level so Q3 conducts. The voltage applied to the gate of Q4 is a low level so Q4 does not conduct. The voltage applied to Q1 is at a low level so Q1 does not conduct. The voltage applied to Q2 transitions to a low level so Q2 stops conducting and the inductor stops discharging. At time T9, Q1 is reactivated by applying a higher voltage to the gate of Q1 and the sequence resumes similar as the sequence began at time T7.

In this way, charge stored in the add-on battery system may be transferred to the external electrical energy storage device. Further, charge may be transferred from the add-on battery system even though battery voltage of the add-on system is higher than battery voltage of the external electrical energy storage device.

Figure 8:
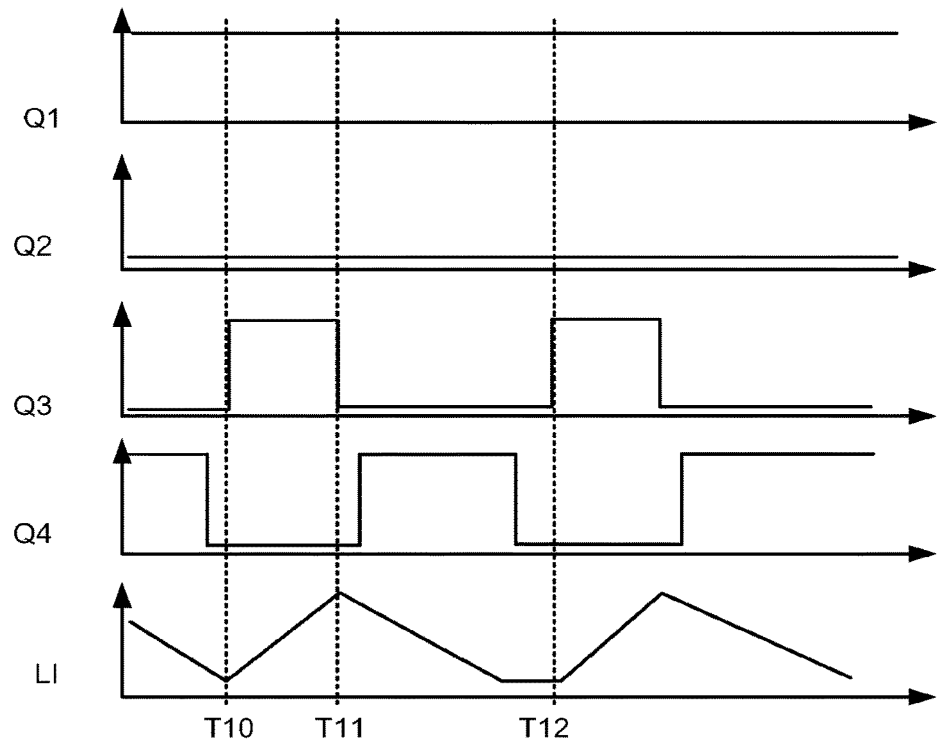
Figure 9:
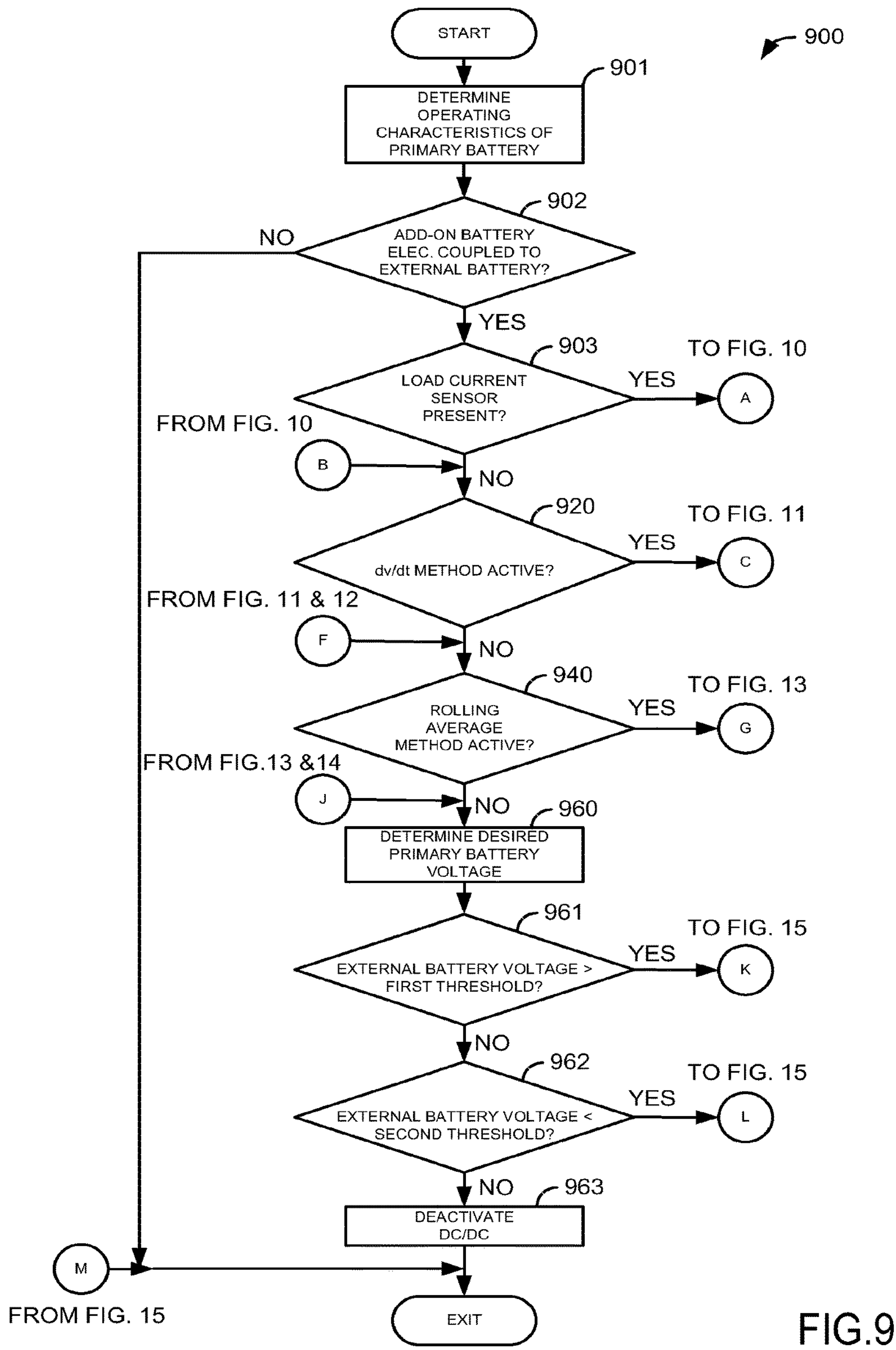
FIGS. 9-15 show an example method for operating the add-on battery system.
Figure 10:
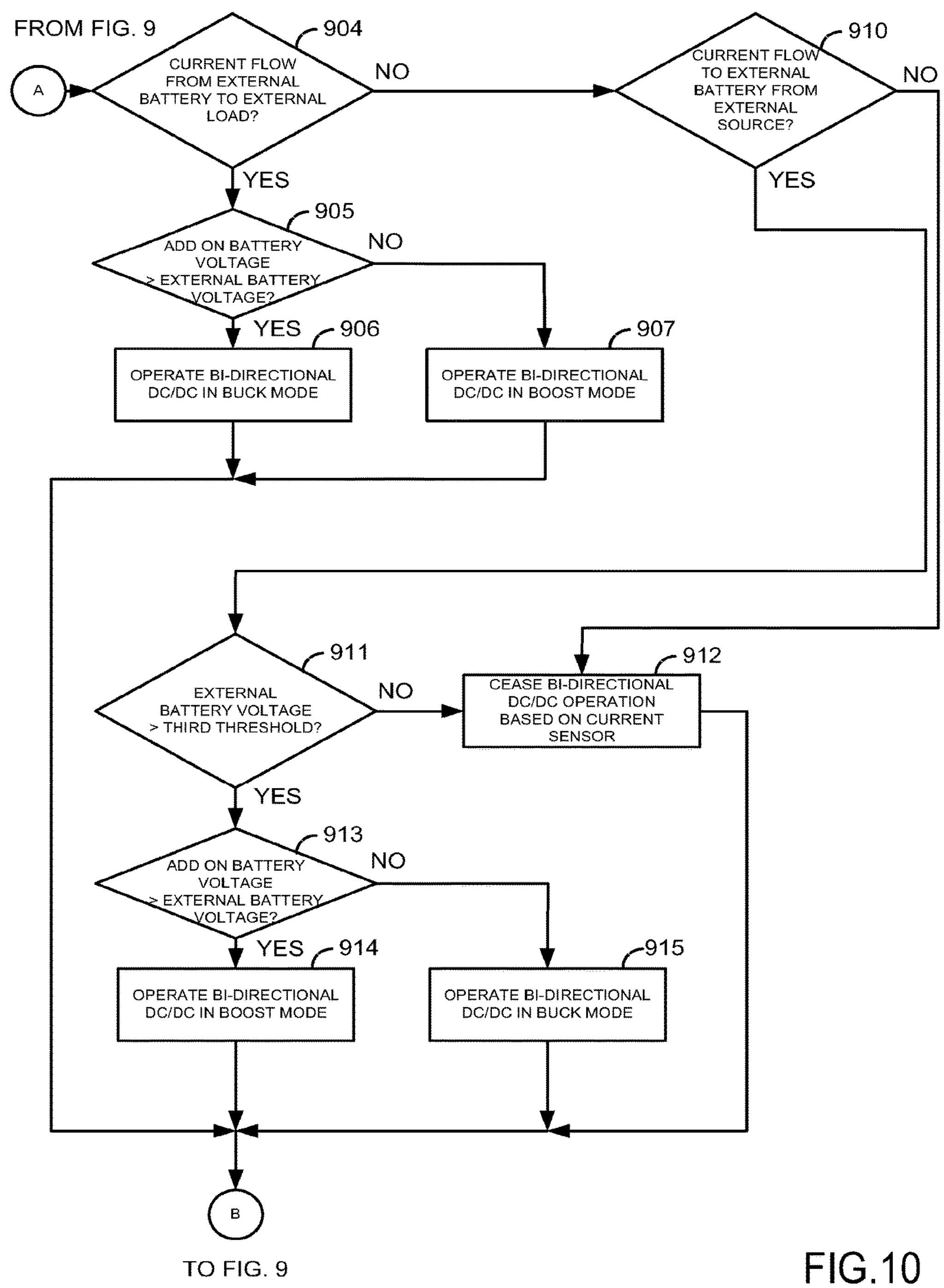
Figure 11:
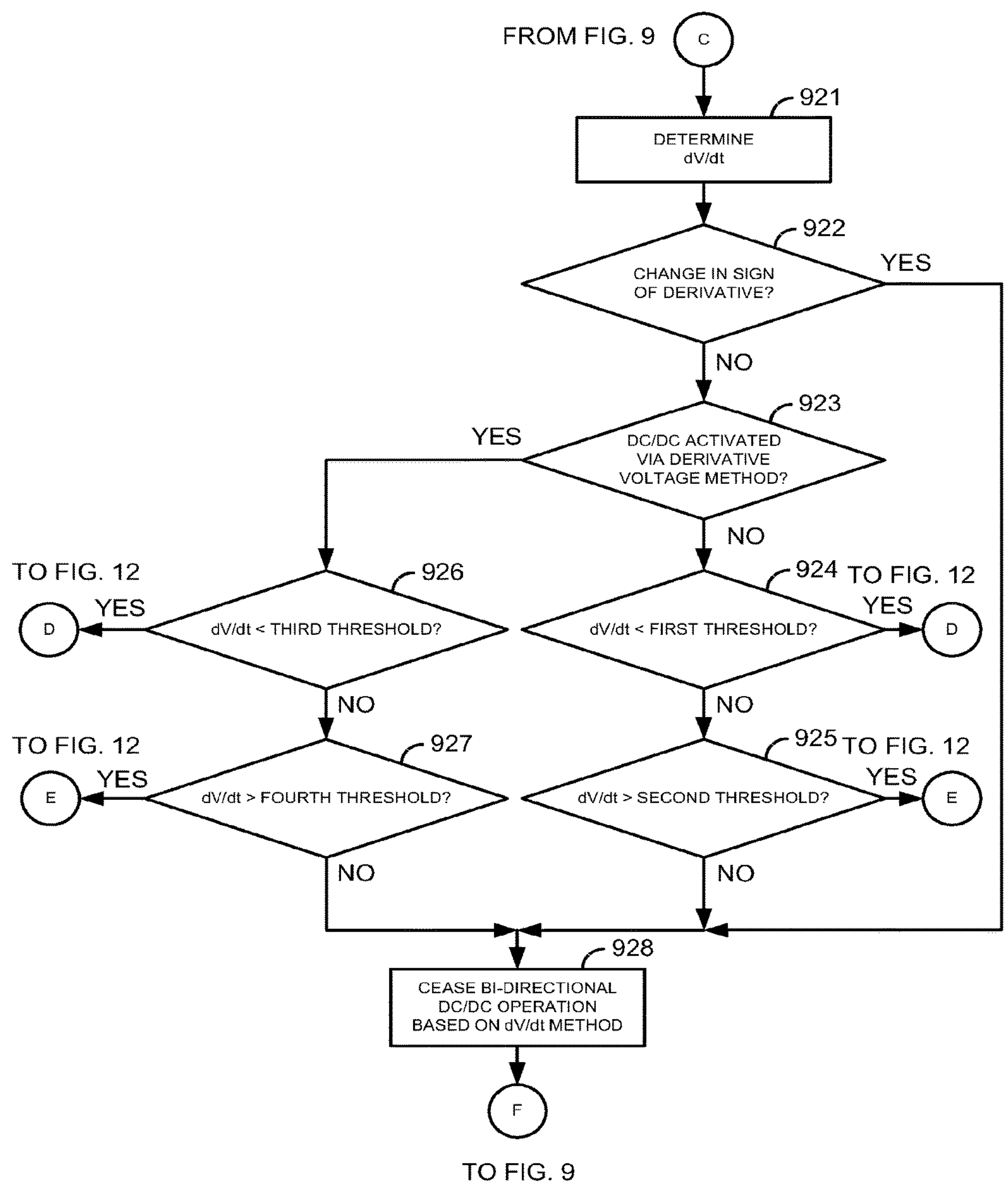
Figure 12:
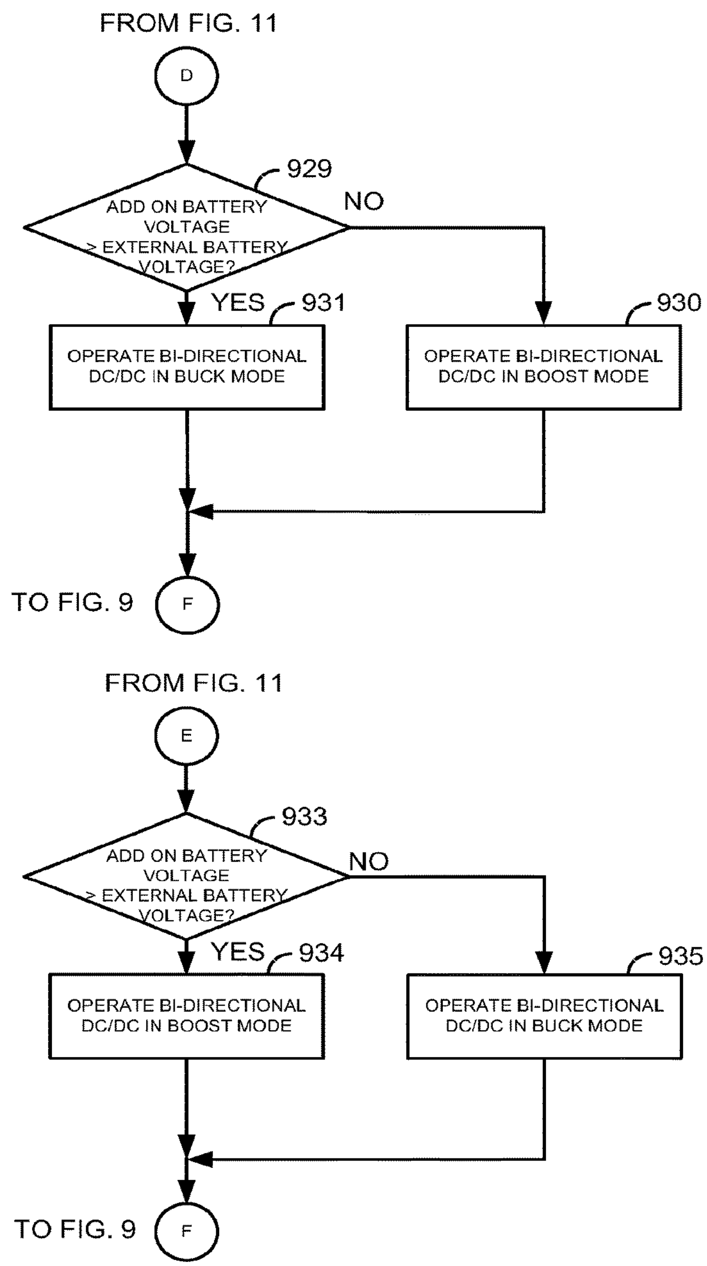
Figure 13:
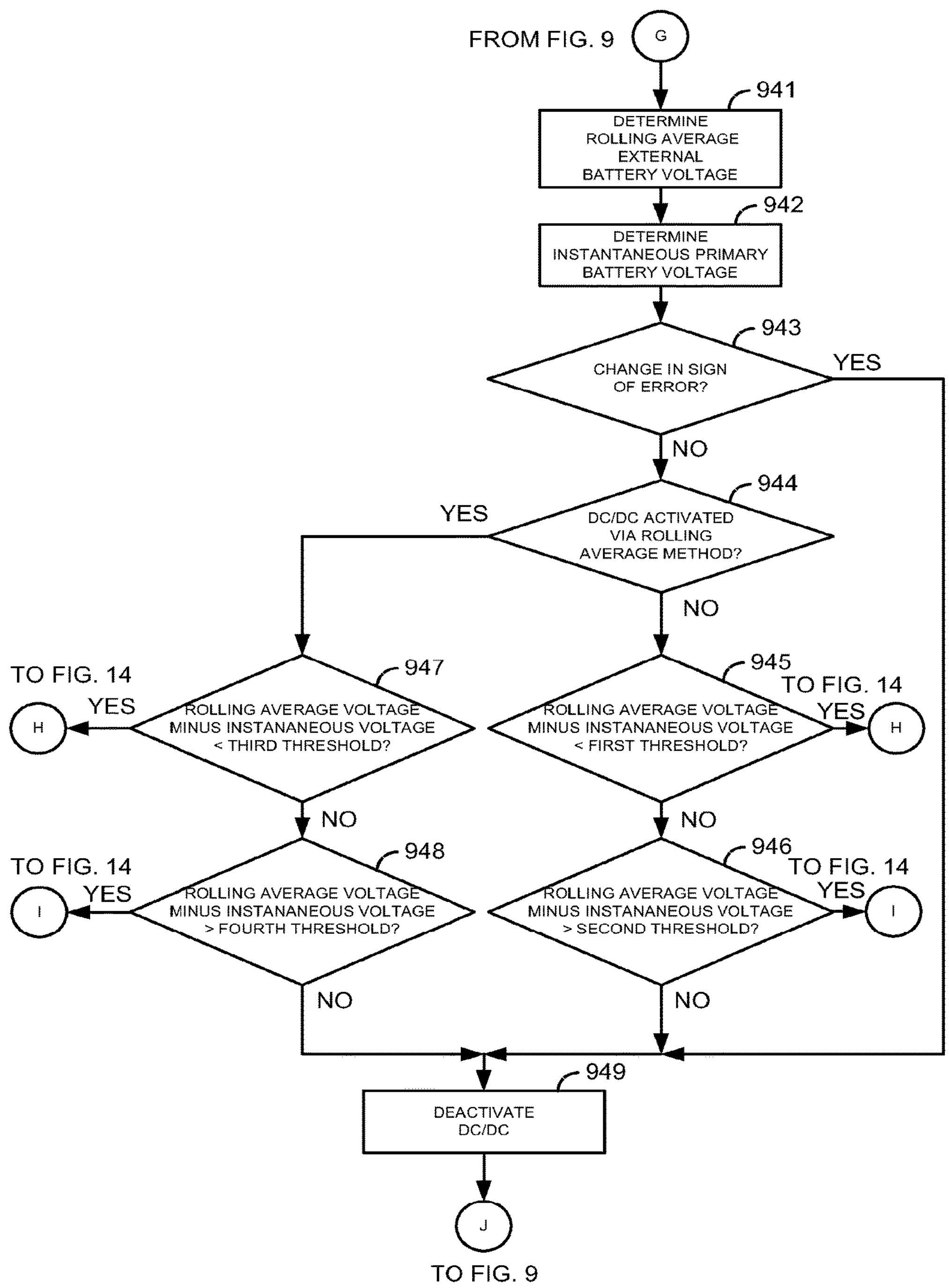
Figure 14:
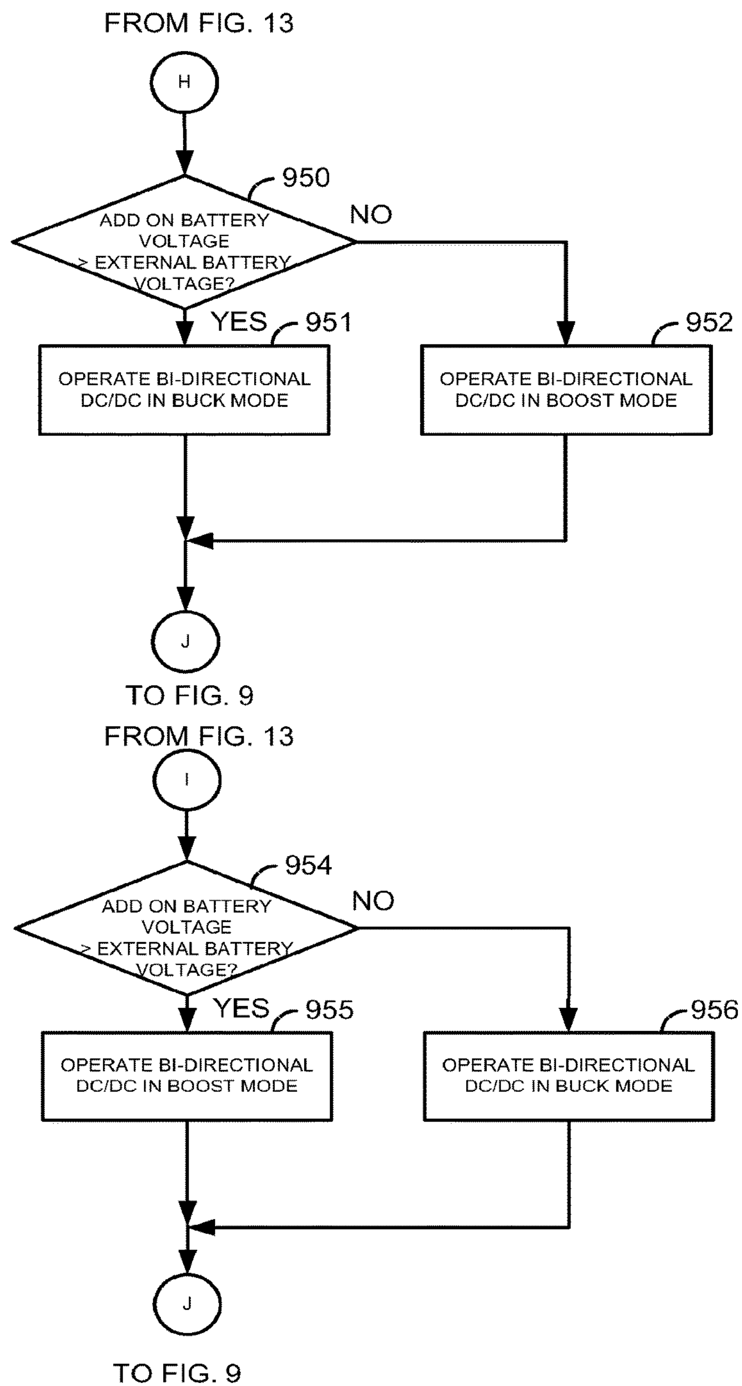
Figure 15:
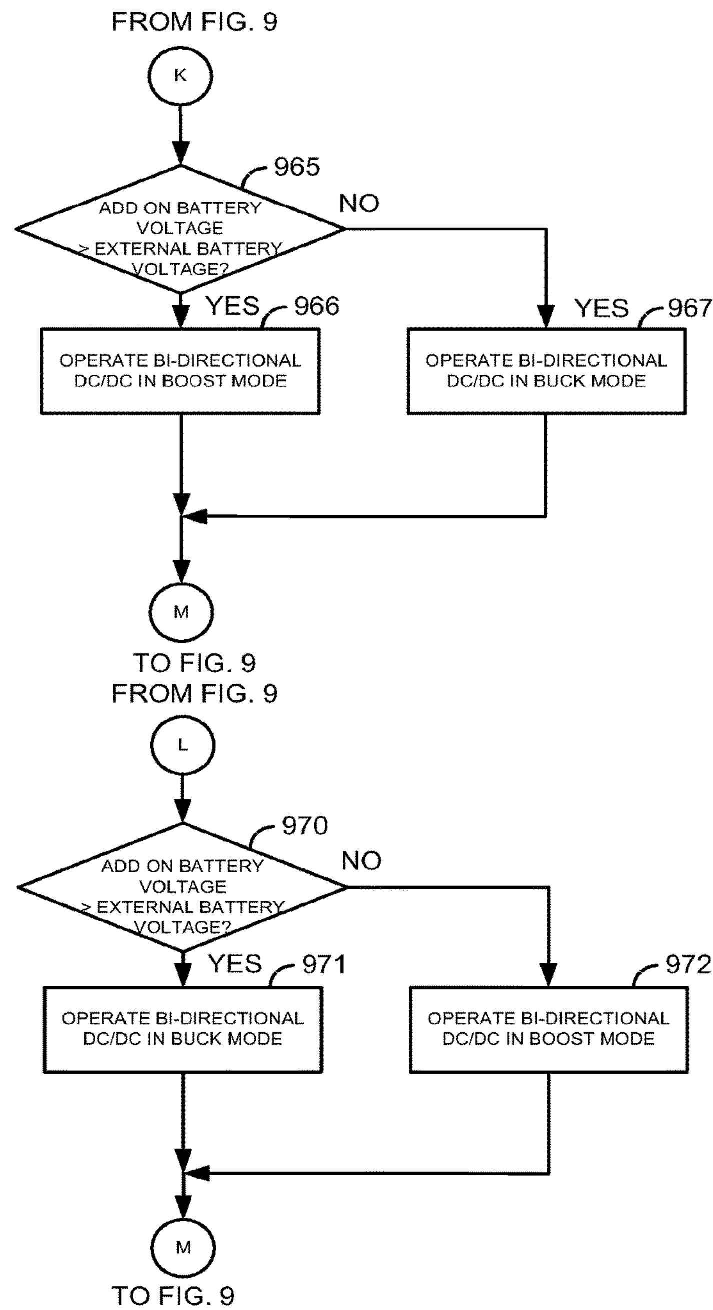

Referring now to FIG. 8, an operating sequence for a bi-directional H-bridge supplying charge from an external electrical energy storage device to an add-on battery system battery is shown. The sequence of FIG. 8 may be provided by the H-bridge of FIG. 4 according to the method of FIGS. 9-15. Times of interest in the sequence are indicated via vertical markers T10-T12. The sequence of FIG. 8 applies when voltage of the add-on battery system battery voltage is less than voltage of the external electrical energy storage device. This mode may be referred to as a buck mode.

The first plot from the top of FIG. 8 is a plot of voltage applied to a gate of MOSFET Q1 of FIG. 4 versus. MOSFET Q1 conducts and allows current to flow between the drain and source of Q1 when the voltage applied to the gate of MOSFET Q1 is a higher value. Voltage applied to the gate of MOSFET Q1 increases in the direction of the vertical axis arrow. Voltage applied to the gate of MOSFET Q1 is near ground potential near the horizontal axis. MOSFET Q1 does not conduct and current does not flow from the drain to source of MOSFET Q1 when the voltage applied to the gate of MOSFET Q1 is near ground potential. The horizontal axis represents time and time increases from the left side of the plot to the right side of the plot.

The second plot from the top of FIG. 8 is a plot of voltage applied to a gate of MOSFET Q2 of FIG. 4 versus time. MOSFET Q2 conducts and allows current to flow between the drain and source of Q2 when the voltage applied to the gate of MOSFET Q2 is a higher value. Voltage applied to the gate of MOSFET Q2 increases in the direction of the vertical axis arrow. Voltage applied to the gate of MOSFET Q2 is near ground potential near the horizontal axis. MOSFET Q2 does not conduct and current does not flow from the drain to source of MOSFET Q2 when the voltage applied to the gate of MOSFET Q2 is near ground potential. The horizontal axis represents time and time increases from the left side of the plot to the right side of the plot.

The third from the top of FIG. 8 is a plot of voltage applied to a gate of MOSFET Q3 of FIG. 4 versus time. MOSFET Q3 conducts and allows current to flow between the drain and source of Q3 when the voltage applied to the gate of MOSFET Q3 is a higher value. Voltage applied to the gate of MOSFET Q3 increases in the direction of the vertical axis arrow. Voltage applied to the gate of MOSFET Q3 is near ground potential near the horizontal axis. MOSFET Q3 does not conduct and current does not flow from the drain to source of MOSFET Q3 when the voltage applied to the gate of MOSFET Q3 is near ground potential. The horizontal axis represents time and time increases from the left side of the plot to the right side of the plot.

The fourth plot from the top of FIG. 8 is a plot of voltage applied to a gate of MOSFET Q4 of FIG. 4 versus time. MOSFET Q4 conducts and allows current to flow between the drain and source of Q4 when the voltage applied to the gate of MOSFET Q4 is a higher value. Voltage applied to the gate of MOSFET Q4 increases in the direction of the vertical axis arrow. Voltage applied to the gate of MOSFET Q4 is near ground potential near the horizontal axis. MOSFET Q4 does not conduct and current does not flow from the drain to source of MOSFET Q4 when the voltage applied to the gate of MOSFET Q4 is near ground potential. The horizontal axis represents time and time increases from the left side of the plot to the right side of the plot.

The fifth plot from the top of FIG. 8 is a plot of H-bridge inductor current (e.g., 442 of FIG. 4) versus time. The H-bridge inductor current is based on the operating states of MOSFETS Q1-Q4. Inductor current increases in the direction of the vertical axis arrow. Inductor current is near zero at the horizontal axis. The horizontal axis represents time and time increases from the left side of the plot to the right side of the plot.

At time T10, voltage applied to the gate of Q1 is a high level so Q1 conducts. The voltage applied to the gate of Q2 is a low level so Q2 does not conduct. The voltage applied to Q3 transitions from a low level to a high level so that Q2 begins to conduct. The voltage applied to Q4 is at a low level so Q4 is not conducting at time T10. Inductor current LI begins to increase when Q3 begins to conduct because current flows from the external electrical energy storage device to the H-bridge inductor. Current may flow into the inductor for a predetermined amount of time or until a specified current flow into the inductor is achieved. The amount of current flowing into the inductor determines the amount of energy stored in the inductor.

At time T11, voltage applied to the gate of Q1 remains at a high level so Q1 conducts. The voltage applied to the gate of Q2 remains at a low level so Q2 does not conduct. The voltage applied to Q3 transitions from the higher level to the lower level so that Q3 stops conducting. The voltage applied to Q4 is at a low level so Q4 is not conducting at time T11, but it transitions to a higher level shortly thereafter so that Q4 begins to conduct. Inductor current LI begins to decrease in response to Q3 being turned off and Q4 being turned on. Energy stored in a field of the inductor is released to the add-on battery system battery when Q4 begins to conduct. The voltage across the inductor is less than the external electrical energy storage device voltage. Thus, Q4 is activated shortly after Q3 is deactivated so that the transistors are operated sequentially (e.g., one after the other).

Just before time T12, voltage applied to the gate of Q1 is a high level so Q1 conducts. The voltage applied to the gate of Q2 is a low level so Q2 does not conduct. The voltage applied to Q3 is at a low level so Q3 does not conduct. The voltage applied to Q4 transitions to a low level so Q4 stops conducting and the inductor stops discharging. At time T12, Q3 is reactivated by applying a higher voltage to the gate of Q3 and the sequence resumes similar as the sequence began at time T10.

In this way, charge stored in the external electrical energy storage device may be transferred to the add-on battery system. Further, charge may be transferred from the external electrical energy storage device even though battery voltage of the external electrical energy storage device is higher than battery voltage of the add-on battery system.

Thus, the H-bridge may be operated in a buck or boost mode to supply charge to the external electrical energy storage device voltage from the add-on battery system battery or to supply charge to the add-on battery system battery from the external electrical energy storage device voltage. By allowing charge to flow from the external electrical energy storage device voltage to the add-on battery system battery, the add-on battery system battery may be recharged when the external electrical energy storage device voltage is recharged by a battery charger. Thus, the add-on battery system battery does not require a dedicated charger to be recharged.

Referring now to FIGS. 9-15, an example method for operating an add-on battery system is shown. The method of FIG. 9 may be included in the system of FIGS. 1-4 as executable instructions stored in non-transitory memory. Further, the method of FIGS. 9-15 may provide the operating sequences shown in FIGS. 5-8.

At 901, method 900 determines operating characteristics of the external electrical energy storage device. In one example, the external electrical energy storage device's operating characteristics may be retrieved from controller memory. The external electrical energy storage device operating characteristics may include but are not limited to charging voltage (e.g., voltage applied to a battery for charging), full charge voltage (e.g., voltage where SOC is 100), type of battery (e.g., lead/acid, Ni/Cd), and charging and discharging current limits. A user may input the operating characteristics of the external electrical energy storage device via a keyboard or user interface. Alternatively, the external electrical energy storage device operating characteristics may be programmed into memory at the time of manufacture. Method 900 proceeds to 902 after external electrical energy storage device operating characteristics are determined.

At 902, method 900 judges if the add-on battery system is electrically coupled to an external electrical energy storage device (e.g., a battery external from the add-on battery system). In one example, method 900 may judge the add-on battery system is electrically coupled to an external battery via sensing presence or absence of voltage at pins of an electrical connector configured to electrically couple the add-on battery system to the external electrical energy storage device. If method 900 judges that the add-on battery system is electrically coupled to an external electrical energy storage device, the answer is yes and method 900 proceeds to 903. Otherwise, the answer is no and method 900 proceeds to exit.

At 903, method 900 judges if the system the add-on battery system is electrically coupled to a system that includes a load current sensor. The load current sensor may sense current that may flow between the external electrical energy storage device and a load powered by the external electrical energy storage device. If method 900 judges that the add-on battery system is electrically coupled to a system that includes a load current sensor, the answer is yes and method 900 proceeds to 904 of FIG. 10. Otherwise, the answer is no and method 900 proceeds to 920.

At 904, method 900 judges if there is current flow from the external electrical energy storage device to the electrical load powered by the external electrical energy storage device. In one example, method 900 judges that there is current flow based on signed output from the current sensor. If method 900 judges that there is current flow from the external electrical energy storage device to the electrical load powered by the external electrical energy storage device, the answer is yes and method 900 proceeds to 905. Otherwise, the answer is no and method 900 proceeds to 910.

At 905, method 900 judges if the add-on battery system battery voltage is greater than the external electrical energy storage device voltage (e.g., battery voltage). In one example, method 900 samples add-on battery system battery voltage and external battery voltage. If the add-on battery system battery voltage is greater than the external battery voltage, the answer is yes and method 900 proceeds to 906. Otherwise, the answer is no and method 900 proceeds to 907.

At 906, method 900 operates the add-on battery system bi-directional DC/DC converter in a buck mode. In buck mode, the higher voltage from the add-on battery system battery is stepped down so that the external battery may be charged using a desired voltage that is less than the add-on battery system battery voltage. The desired voltage may be retrieved from memory and H-bridge MOSFET switching times may be adjusted to provide the desired voltage from the add-on battery system battery to the external battery. Table 1 identifies transistor operating states for the transistors of FIG. 4 operating in buck mode transferring charge from the add-on battery system battery to the external battery.

TABLE 1

| Current direction | Voltage level | H-bridge configuration | Q1 Mode | Q2 Mode | Q3 Mode | Q4 Mode |
|---|---|---|---|---|---|---|
| Add-on to external | Va < Ve | BOOST | ON | OFF | !PWM | PWM |

TABLE 1-continued

| Current direction | Voltage level | H-bridge configuration | Q1 Mode | Q2 Mode | Q3 Mode | Q4 Mode |
|---|---|---|---|---|---|---|
| Add-on to external | Va > Ve | BUCK | PWM | !PWM | ON | OFF |
| External to add-on | Ve < Va | BOOST | !PWM | PWM | ON | OFF |
| External to add-on | Ve > Va | BUCK | ON | OFF | PWM | !PWM |

The first column on the left side of table 1 indicates the direction of current flow. Current and electrical power flows from the add-on battery system battery to the external battery when current flow is indicated as "add-on to external." Current and electrical power flows from the external battery to the add-on battery system battery when current flow is indicated as "external to add-on." The second column indicates voltage level between the add-on battery system battery voltage (Va) and the external system battery voltage (Ve) for the current direction. The third column indicates the H-bridge operating configuration that supplies current in the indicated direction according to the voltage levels of the add-on battery system battery and the external system battery. "BOOST" indicates the H-bridge is operated in a boost mode when transistors Q1-Q4 of the system shown in FIG. 4 are operated according to the indicated transistor modes Q1-Q4 located in columns to the right of the H-bridge configuration column. Transistors Q1-Q4 may not be operated and indicated as "OFF," operated in a continuous conducting state "ON," cycled conducting and not conducting via a pulse width modulated signal and indicated as "PWM," or cycled conducting and not conducting via a near inverse pulse width modulation signal as indicated as "!PWM."

Thus, to operate the H-bridge in a buck mode when add-on battery system battery voltage is greater than external electrical energy storage device voltage, Q1 is operated in PWM mode, Q2 is operated in !PWM mode, Q3 is operated ON, and Q4 is OFF. In this way, charge may be transferred from the add-on battery system to the external electrical energy storage device to extend external electrical energy storage device operation. Further, since it has been determined at 904 that the external load is consuming charge, a majority of add-on battery system charge supplied to the external electrical energy storage device is directly transferred to the electrical load that is electrically coupled to the external electrical energy storage device. Consequently, add-on battery system charge may be applied more efficiently as compared to simply charging the external electrical energy storage device. Method 900 proceeds to return to 920 of FIG. 9 after 906 completes.

At 907, method 900 operates the add-on battery system bi-directional DC/DC converter in a boost mode. In boost mode, the lower voltage from the add-on battery system battery is stepped up so that the external battery may be charged using a desired voltage that is greater than the add-on battery system battery voltage. The desired voltage may be retrieved from memory and H-bridge MOSFET switching times may be adjusted to provide the desired voltage from the add-on battery system battery to the external battery. Table 1 identifies transistor operating states for the transistors of FIG. 4 operating in boost mode transferring charge from the add-on battery system battery to the external battery.

Thus, to operate the H-bridge in a boost mode when add-on battery system battery voltage is less than external electrical energy storage device voltage, Q1 is ON, Q2 is OFF, Q3 is operated !PWM, and Q4 is operated PWM. In this way, charge may be transferred from the add-on battery system to the external electrical energy storage device to extend external electrical energy storage device operation. Further, since it has been determined at 904 that the external load is consuming charge, a majority of add-on battery system charge supplied to the external electrical energy storage device is directly transferred to the electrical load that is electrically coupled to the external electrical energy storage device. Consequently, add-on battery system charge may be applied more efficiently as compared to simply charging the external electrical energy storage device. Method 900 proceeds to return to 920 of FIG. 9 after 907 completes.

At 910, method 900 judges if current is flowing to the external energy storage device from a source external to the add-on battery system (e.g., a charger or a motor operating as a generator). In one example, method 900 judges that there is current flow based on signed output from the current sensor. If method 900 judges that there is current flow from to the external electrical energy storage device, the answer is yes and method 900 proceeds to 911. Otherwise, the answer is no and method 900 proceeds to 912.

At 912, method 900 ceases to operate the bi-directional DC/DC converter to transfer charge if the bi-directional DC/DC converter is transferring charge based on current sensor output. If the bi-directional DC/DC converter is transferring charge based on the voltage method of FIG. 15, the bi-directional DC/DC converter may continue to transfer charge. Thus, the bi-directional DC/DC converter may transfer or stop transferring charge between the add-on battery system and the external electrical energy storage device in response to current sensor output. Method 900 proceeds to return to 920 of FIG. 9 after 912 completes.

At 911, method 900 judges if external energy storage device voltage is greater than a third threshold. In one example, method 900 compares external energy storage device voltage to the third threshold voltage. If method 900 judges that external energy storage device voltage is greater than the third threshold voltage, the answer is yes and method 900 proceeds to 913. Otherwise, the answer is no and method 900 proceeds to 912. In this way, method 900 may start add-on battery system battery charging only after the external electrical energy storage device is charged to a threshold level so that the external electrical energy storage device is given charging priority.

At 913, method 900 judges if the add-on battery system battery voltage is greater than the external electrical energy storage device voltage (e.g., battery voltage). In one example, method 900 samples add-on battery system battery voltage and external battery voltage. If the add-on battery system battery voltage is greater than the external battery voltage, the answer is yes and method 900 proceeds to 914. Otherwise, the answer is no and method 900 proceeds to 915.

At 914, method 900 operates the add-on battery system bi-directional DC/DC converter in a boost mode. In boost mode, the lower voltage from the external battery is stepped up so that the add-on battery system battery may be charged using a desired voltage that is greater than the external battery voltage. The desired voltage may be retrieved from memory and H-bridge MOSFET switching times may be adjusted to provide the desired voltage from the external battery to the add-on battery system battery. Table 1 identifies transistor operating states for the transistors of FIG. 4 operating in boost mode transferring charge from the external battery to the add-on battery system battery.

Thus, to operate the H-bridge in a boost mode when add-on battery system battery voltage is greater than external electrical energy storage device voltage, Q1 is operated in !PWM mode, Q2 is operated in PWM mode, Q3 is operated ON, and Q4 is OFF. In this way, charge may be transferred from the external electrical energy storage device to the add-on battery system battery to recharge the add-on battery system battery or electrical energy storage device. Method 900 proceeds to return to 920 of FIG. 9 after 914 completes.

At 915, method 900 operates the add-on battery system bi-directional DC/DC converter in a buck mode. In buck mode, the higher voltage from the external energy storage device is stepped down so that the add-on battery system battery may be charged using a desired voltage that is less than the external energy storage device voltage. The desired voltage may be retrieved from memory and H-bridge MOSFET switching times may be adjusted to provide the desired voltage from the add-on battery system battery to the external battery. Table 1 identifies transistor operating states for the transistors of FIG. 4 operating in buck mode transferring charge from the external energy storage device to the add-on battery system battery.

Thus, to operate the H-bridge in a buck mode when add-on battery system battery voltage is less than external electrical energy storage device voltage, Q1 is ON, Q2 is OFF, Q3 is operated in PWM mode, and Q4 is operated in !PWM mode. In this way, charge may be transferred from the external electrical energy storage device to the add-on battery system battery to recharge the add-on battery system battery or electrical energy storage device. Method 900 proceeds to return to 920 of FIG. 9 after 915 completes.

At 920, method 900 judges if a derivative method to operate the bi-directional DC/DC converter is active. The derivative method judges whether or not to operate the bi-directional DC/DC converter to transfer charge between the add-on battery system battery and the external electrical energy storage device voltage based on a rate of change in external electrical energy storage device voltage. In one example, a bit in memory may indicate whether or not the derivative method is active. If method 900 judges that the derivative method is active, the answer is yes and method 900 proceeds to 921 of FIG. 11. Otherwise, the answer is no and method 900 proceeds to 940.

At 921, method 900 determines a derivative of the external electrical energy storage device voltage. The derivative may be determined by sampling the external electrical energy storage device voltage at a first time and a second time and dividing the voltage difference by the time between the two samples. The derivative may be expressed as:

$$\frac{dV}{dt} = \frac{V(k) - V(k-1)}{t(k) - t(k-1)}$$

where V represents the external electrical energy storage device voltage, k represents the sample number, and t represents time. Method 900 proceeds to 922 after the derivative is determined.

At 922, method 900 judges whether or not there is a change in sign of the derivative determined at 921 from a previously determined derivative value during conditions where the derivative method has activated the bi-directional DC/DC converter. A change in sign may be indicative of a change in current direction from or to the external electrical energy storage device. Thus, a change in derivative sign may be a basis for ceasing bi-directional DC/DC converter operation based on the derivative method because of absence or reduction of current flow into or out of the external electrical energy storage device. Further, in some examples, method 900 may judge if the derivative value is greater than a threshold value in the presence of a change in the derivative sign. The bi-directional DC/DC converter may deactivated in response to a change in the derivative sign and a substantial change in the derivative value because these parameters may provide a strong indication of a change in load on the external electrical energy storage device. If method 900 judges that there is a change in derivative sign after the bi-directional DC/DC converter has been activated by the derivative method, or alternatively, if there is a change in derivative sign after the bi-directional DC/DC converter has been activated by the derivative method and the absolute value of the derivative is greater than a threshold value, the answer is yes and method 900 proceeds to 928. Otherwise, the answer is no and method 900 proceeds to 923.

At 923, method 900 judges if the bi-directional DC/DC converter has already been activated and is presently active based on the derivative method beginning at 921. Method 900 judges which thresholds are to be applied for the derivative method to determine if the derivative's value is sufficient to activate the bi-directional DC/DC converter.

The change in external electrical energy storage device voltage may be indicative of current consumption via a load that is electrically coupled to the external electrical energy storage device. For example, external electrical energy storage device voltage may be reduced in response to a load applied to the external electrical energy storage device. However, once the DC/DC converter is activated and supplies charge to the external electrical energy storage device, the value of the derivative may be reduced. Likewise, external electrical energy storage device voltage may be increase in response to an external source charging the external electrical energy storage device. However, once the bi-directional DC/DC converter is activated and transfers charge to the add-on battery system battery, the value of the derivative may be reduced.

Method 900 may change a state of a bit in memory to indicate whether or not the bi-directional DC/DC converter has been activated based on the derivative method. If method 900 judges that the bi-directional DC/DC converter has been activated and that the bi-directional DC/DC converter is activated based on the derivative method, the answer is yes and method 900 proceeds to 926. Otherwise, the answer is no and method 900 proceeds to 924.

At 924, method 900 judges whether or not the value of the derivative determined at 921 is less than a first threshold value. For example, if the derivative value is minus five and the threshold value is minus two, the answer is yes and method 900 proceeds to 929 of FIG. 12. The derivative value being less than the first threshold value may be indicative of a substantial external load being applied to the external electrical energy storage device. If the answer is no, method 900 proceeds to 925.

At 929, method 900 judges if the add-on battery system battery voltage is greater than the external electrical energy storage device voltage (e.g., battery voltage). In one example, method 900 samples add-on battery system battery voltage and external battery voltage. If the add-on battery system battery voltage is greater than the external battery voltage, the answer is yes and method 900 proceeds to 931. Otherwise, the answer is no and method 900 proceeds to 930.

At 931, method 900 operates the add-on battery system bi-directional DC/DC converter in a buck mode. In buck mode, the higher voltage from the add-on battery system battery is stepped down so that the external electrical energy storage device may be charged using a desired voltage that is less than the add-on battery system battery voltage. The desired voltage may be retrieved from memory and H-bridge MOSFET switching times may be adjusted to provide the desired voltage from the add-on battery system battery to the external electrical energy storage device. Table 1 identifies transistor operating states for the transistors of FIG. 4 operating in buck mode transferring charge from the add-on battery system battery to the external battery.

Thus, to operate the H-bridge in a buck mode when add-on battery system battery voltage is greater than external electrical energy storage device voltage, Q1 is operated in PWM mode, Q2 is operated in !PWM mode, Q3 is operated ON, and Q4 is OFF. In this way, charge may be transferred from the add-on battery system to the external electrical energy storage device to extend external electrical energy storage device operation. Further, since the derivative value indicates that the external load is consuming charge, a majority of add-on battery system charge supplied to the external electrical energy storage device is directly transferred to the electrical load that is electrically coupled to the external electrical energy storage device. Consequently, add-on battery system charge may be applied more efficiently as compared to simply charging the external electrical energy storage device. Method 900 proceeds to return to 940 of FIG. 9 after 931 completes.

At 930, method 900 operates the add-on battery system bi-directional DC/DC converter in a boost mode. In boost mode, the lower voltage from the add-on battery system battery is stepped up so that the external electrical energy storage device may be charged using a desired voltage that is greater than the add-on battery system battery voltage. The desired voltage may be retrieved from memory and H-bridge MOSFET switching times may be adjusted to provide the desired voltage from the add-on battery system battery to the external battery. Table 1 identifies transistor operating states for the transistors of FIG. 4 operating in boost mode transferring charge from the add-on battery system battery to the external battery.

Thus, to operate the H-bridge in a boost mode when add-on battery system battery voltage is less than external electrical energy storage device voltage, Q1 is ON, Q2 is OFF, Q3 is operated in !PWM mode, and Q4 is operated in PWM mode. In this way, charge may be transferred from the add-on battery system to the external electrical energy storage device to extend external electrical energy storage device operation. Further, since the derivative value indicates that the external load is consuming charge, a majority of add-on battery system charge supplied to the external electrical energy storage device is directly transferred to the electrical load that is electrically coupled to the external electrical energy storage device. Consequently, add-on battery system charge may be applied more efficiently as compared to simply charging the external electrical energy storage device. Method 900 proceeds to return to 940 of FIG. 9 after 930 completes.

At 925, method 900 judges whether or not the value of the derivative determined at 921 is greater than a second threshold value. For example, if the derivative value is five and the second threshold value is two, the answer is yes and method 900 proceeds to 933 of FIG. 12. The derivative value being less than the first threshold value may be indicative of substantial external charging of the external electrical energy storage device. If the answer is no, method 900 proceeds to 928.

At 933, method 900 judges if the add-on battery system battery voltage is greater than the external electrical energy storage device voltage (e.g., battery voltage). In one example, method 900 samples add-on battery system battery voltage and external battery voltage. If the add-on battery system battery voltage is greater than the external energy storage device voltage, the answer is yes and method 900 proceeds to 934. Otherwise, the answer is no and method 900 proceeds to 935.

At 934, method 900 operates the add-on battery system bi-directional DC/DC converter in a boost mode. In boost mode, the lower voltage from the external battery is stepped up so that the add-on battery system battery may be charged using a desired voltage that is greater than the external battery voltage. The desired voltage may be retrieved from memory and H-bridge MOSFET switching times may be adjusted to provide the desired voltage from the external battery to the add-on battery system battery. Table 1 identifies transistor operating states for the transistors of FIG. 4 operating in boost mode transferring charge from the external battery to the add-on battery system battery.

Thus, to operate the H-bridge in a boost mode when add-on battery system battery voltage is greater than external electrical energy storage device voltage, Q1 is operated in !PWM mode, Q2 is operated in PWM mode, Q3 is operated ON, and Q4 is OFF. In this way, charge may be transferred from the external electrical energy storage device to the add-on battery system battery to recharge the add-on battery system battery or electrical energy storage device. Method 900 proceeds to return to 940 of FIG. 9 after 934 completes.

At 935, method 900 operates the add-on battery system bi-directional DC/DC converter in a buck mode. In buck mode, the higher voltage from the external energy storage device is stepped down so that the add-on battery system battery may be charged using a desired voltage that is less than the external energy storage device voltage. The desired voltage may be retrieved from memory and H-bridge MOSFET switching times may be adjusted to provide the desired voltage from the add-on battery system battery to the external battery. Table 1 identifies transistor operating states for the transistors of FIG. 4 operating in buck mode transferring charge from the external energy storage device to the add-on battery system battery.

Thus, to operate the H-bridge in a buck mode when add-on battery system battery voltage is less than external electrical energy storage device voltage, Q1 is ON, Q2 is OFF, Q3 is operated in PWM mode, and Q4 is operated in !PWM mode. In this way, charge may be transferred from the external electrical energy storage device to the add-on battery system battery to recharge the add-on battery system battery or electrical energy storage device. Method 900 proceeds to return to 940 of FIG. 9 after 935 completes.

At 928, method 900 ceases to operate the bi-directional DC/DC converter to transfer charge between the add-on battery system and the external electrical energy storage device based on the derivative method. Method 900 may continue to transfer charge between the add-on battery system and the external electrical energy storage device based on the voltage method that begins at 960. Method 900 returns to 940 of FIG. 9 after step 928.

At 926, method 900 judges whether or not the value of the derivative determined at 921 is less than a third threshold value. The third threshold value may be less than the first threshold at 924 because the bi-directional DC/DC converter may be supplying charge to the external electrical energy storage device. Consequently, the derivative value may be reduced, yet it still may be desirable to operate the bi-directional DC/DC converter. If the derivative value is greater than the third threshold value, the answer is yes and method 900 proceeds to 929 of FIG. 12. If the answer is no, method 900 proceeds to 927.

At 927, method 900 judges whether or not the value of the derivative determined at 921 is greater than a fourth threshold value. The fourth threshold value may be less than the second threshold value at 925 because the bi-directional DC/DC converter may be supplying charge to the add-on battery system battery. Consequently, the derivative value may be reduced, yet it still may be desirable to operate the bi-directional DC/DC converter. If the derivative value is less than the fourth, threshold value, the answer is yes and method 900 proceeds to 933 of FIG. 12. If the answer is no, method 900 proceeds to 928.

At 940, method 900 judges if a rolling average method to operate the bi-directional DC/DC converter is active. The rolling average method judges whether or not to operate the bi-directional DC/DC converter to transfer charge between the add-on battery system battery and the external electrical energy storage device voltage based on a difference in a rolling average of the external electrical energy storage device voltage and instantaneous external electrical energy device voltage. In one example, a bit in memory may indicate whether or not the rolling average method is active. The rolling average method may be activated via a user interface or programming during manufacture. If method 900 judges that the rolling average method is active, the answer is yes and method 900 proceeds to 941 of FIG. 13. Otherwise, the answer is no and method 900 proceeds to 960.

At 941, method 900 determines a rolling average of external energy storage device voltage. The rolling average may be based on a predetermined number of voltage samples (e.g., 5) observed at a predetermined frequency (e.g., 0.5 Hz). The rolling average may be expressed as:

$$V_{ave} = \frac{V(k) + V(k-1) + V(k-2) + V(k-3) + V(k-4)}{5}$$

where V represents the external electrical energy storage device voltage, and k represents the sample number. This example is based on five samples, but a different number of samples may be used if desired. Method 900 proceeds to 942 after the rolling average is determined.

At 942, method 900 determines instantaneous external energy storage device voltage. Instantaneous external energy storage device voltage is determined by sampling instantaneous external energy storage device voltage at the present time. Method 900 proceeds to 943 after the instantaneous external energy storage device voltage is determined.

At 943, method 900 judges whether or not there is a change in sign of an error value determined from the rolling average. The error is the instantaneous external energy storage device voltage determined at 942 minus the rolling average determined at 941. The sign value of the error may be stored to memory each time the error is determined and it may be compared to the sign of the previously determined error value. A change in sign may be indicative of a change in current direction from or to the external electrical energy storage device. Thus, a change in error sign may be a basis for ceasing bi-directional DC/DC converter operation based on the derivative method because of absence or reduction of current flow into or out of the external electrical energy storage device. Further, in some examples, method 900 may judge if the error value is greater than a threshold value in the presence of a change in the error sign. The bi-directional DC/DC converter may deactivated in response to a change in the error sign and a substantial change in the error value because these parameters may provide a strong indication of a change in load on the external electrical energy storage device. If method 900 judges that there is a change in error sign after the bi-directional DC/DC converter has been activated by the rolling average method, or alternatively, if there is a change in error sign after the bi-directional DC/DC converter has been activated by the rolling average method and the absolute value of the error is greater than a threshold value, the answer is yes and method 900 proceeds to 949. Otherwise, the answer is no and method 900 proceeds to 944.

At 944, method 900 judges if the bi-directional DC/DC converter has already been activated and is presently active based on the rolling average method beginning at 941. Method 900 judges which thresholds are to be applied for the rolling average method to determine if the rolling average value is sufficient to activate the bi-directional DC/DC converter.

Method 900 may change a state of a bit in memory to indicate whether or not the bi-directional DC/DC converter has been activated based on the rolling average method. If method 900 judges that the bi-directional DC/DC converter has been activated and that the bi-directional DC/DC converter is activated based on the rolling average method, the answer is yes and method 900 proceeds to 947. Otherwise, the answer is no and method 900 proceeds to 945.

At 945, method 900 judges whether or not the value of the error determined at 943 (e.g., instantaneous voltage minus rolling average voltage) is less than a first threshold value. For example, if the error is minus five and the threshold value is minus two, the answer is yes and method 900 proceeds to 950 of FIG. 14. The error value being less than the first threshold value may be indicative of a substantial external load being applied to the external electrical energy storage device. If the answer is no, method 900 proceeds to 946.

At 950, method 900 judges if the add-on battery system battery voltage is greater than the external electrical energy storage device voltage (e.g., battery voltage). In one example, method 900 samples add-on battery system battery voltage and external battery voltage. If the add-on battery system battery voltage is greater than the external battery voltage, the answer is yes and method 900 proceeds to 951. Otherwise, the answer is no and method 900 proceeds to 952.

At 951, method 900 operates the add-on battery system bi-directional DC/DC converter in a buck mode. In buck mode, the higher voltage from the add-on battery system battery is stepped down so that the external electrical energy storage device may be charged using a desired voltage that is less than the add-on battery system battery voltage. The desired voltage may be retrieved from memory and H-bridge MOSFET switching times may be adjusted to provide the desired voltage from the add-on battery system battery to the external electrical energy storage device. Table 1 identifies transistor operating states for the transistors of FIG. 4 operating in buck mode transferring charge from the add-on battery system battery to the external battery.

Thus, to operate the H-bridge in a buck mode when add-on battery system battery voltage is greater than external electrical energy storage device voltage, Q1 is operated in PWM mode, Q2 is operated in !PWM mode, Q3 is operated ON, and Q4 is OFF. In this way, charge may be transferred from the add-on battery system to the external electrical energy storage device to extend external electrical energy storage device operation. Further, since the derivative value indicates that the external load is consuming charge, a majority of add-on battery system charge supplied to the external electrical energy storage device is directly transferred to the electrical load that is electrically coupled to the external electrical energy storage device. Consequently, add-on battery system charge may be applied more efficiently as compared to simply charging the external electrical energy storage device. Method 900 proceeds to return to 960 of FIG. 9 after 951 completes.

At 952, method 900 operates the add-on battery system bi-directional DC/DC converter in a boost mode. In boost mode, the lower voltage from the add-on battery system battery is stepped up so that the external electrical energy storage device may be charged using a desired voltage that is greater than the add-on battery system battery voltage. The desired voltage may be retrieved from memory and H-bridge MOSFET switching times may be adjusted to provide the desired voltage from the add-on battery system battery to the external battery. Table 1 identifies transistor operating states for the transistors of FIG. 4 operating in boost mode transferring charge from the add-on battery system battery to the external battery.

Thus, to operate the H-bridge in a boost mode when add-on battery system battery voltage is less than external electrical energy storage device voltage, Q1 is ON, Q2 is OFF, Q3 is operated in !PWM mode, and Q4 is operated in PWM mode. In this way, charge may be transferred from the add-on battery system to the external electrical energy storage device to extend external electrical energy storage device operation. Further, since the derivative value indicates that the external load is consuming charge, a majority of add-on battery system charge supplied to the external electrical energy storage device is directly transferred to the electrical load that is electrically coupled to the external electrical energy storage device. Consequently, add-on battery system charge may be applied more efficiently as compared to simply charging the external electrical energy storage device. Method 900 proceeds to return to 960 of FIG. 9 after 952 completes.

At 946, method 900 judges whether or not the value of the error determined at 943 is greater than a second threshold value. For example, if the error value is five and the second threshold value is two, the answer is yes and method 900 proceeds to 954 of FIG. 14. The error value being less than the first threshold value may be indicative of substantial external charging of the external electrical energy storage device. If the answer is no, method 900 proceeds to 949.

At 954, method 900 judges if the add-on battery system battery voltage is greater than the external electrical energy storage device voltage (e.g., battery voltage). In one example, method 900 samples add-on battery system battery voltage and external battery voltage. If the add-on battery system battery voltage is greater than the external energy storage device voltage, the answer is yes and method 900 proceeds to 955. Otherwise, the answer is no and method 900 proceeds to 956.

At 955, method 900 operates the add-on battery system bi-directional DC/DC converter in a boost mode. In boost mode, the lower voltage from the external battery is stepped up so that the add-on battery system battery may be charged using a desired voltage that is greater than the external battery voltage. The desired voltage may be retrieved from memory and H-bridge MOSFET switching times may be adjusted to provide the desired voltage from the external battery to the add-on battery system battery. Table 1 identifies transistor operating states for the transistors of FIG. 4 operating in boost mode transferring charge from the external battery to the add-on battery system battery.

Thus, to operate the H-bridge in a boost mode when add-on battery system battery voltage is greater than external electrical energy storage device voltage, Q1 is operated in !PWM mode, Q2 is operated in PWM mode, Q3 is operated ON, and Q4 is OFF. In this way, charge may be transferred from the external electrical energy storage device to the add-on battery system battery to recharge the add-on battery system battery or electrical energy storage device. Method 900 proceeds to return to 960 of FIG. 9 after 955 completes.

At 956, method 900 operates the add-on battery system bi-directional DC/DC converter in a buck mode. In buck mode, the higher voltage from the external energy storage device is stepped down so that the add-on battery system battery may be charged using a desired voltage that is less than the external energy storage device voltage. The desired voltage may be retrieved from memory and H-bridge MOSFET switching times may be adjusted to provide the desired voltage from the add-on battery system battery to the external battery. Table 1 identifies transistor operating states for the transistors of FIG. 4 operating in buck mode transferring charge from the external energy storage device to the add-on battery system battery.

Thus, to operate the H-bridge in a buck mode when add-on battery system battery voltage is less than external electrical energy storage device voltage, Q1 is ON, Q2 is OFF, Q3 is operated in PWM mode, and Q4 is operated in !PWM mode. In this way, charge may be transferred from the external electrical energy storage device to the add-on battery system battery to recharge the add-on battery system battery or electrical energy storage device. Method 900 proceeds to return to 960 of FIG. 9 after 956 completes.

At 949, method 900 ceases to operate the bi-directional DC/DC converter to transfer charge between the add-on battery system and the external electrical energy storage device based on the rolling average method. Method 900 may continue to transfer charge between the add-on battery system and the external electrical energy storage device based on the voltage method that begins at 960. Method 900 returns to 960 of FIG. 9 after step 949.

At 947, method 900 judges whether or not the value of the error determined at 943 is less than a third threshold value. The third threshold value may be less than the first threshold at 945 because the bi-directional DC/DC converter may be supplying charge to the external electrical energy storage device. Consequently, the error value may be reduced, yet it still may be desirable to operate the bi-directional DC/DC converter. If the error value is greater than the third threshold value, the answer is yes and method 900 proceeds to 950 of FIG. 14. If the answer is no, method 900 proceeds to 948.

At 948, method 900 judges whether or not the value of the error determined at 943 is greater than a fourth threshold value. The fourth threshold value may be less than the second threshold value at 946 because the bi-directional DC/DC converter may be supplying charge to the add-on battery system battery. Consequently, the error value may be reduced, yet it still may be desirable to operate the bi-directional DC/DC converter. If the error value is less than the fourth threshold value, the answer is yes and method 900 proceeds to 954 of FIG. 14. If the answer is no, method 900 proceeds to 949.

At 960, method 900 determines a desired external energy storage device voltage. In one example, method 900 selects a desired external energy storage device voltage based on a desired state of charge (SOC) for the external energy storage device. For example, if output voltage of a battery is 25.25 volts at 70% SOC, method 900 selects 25.25 volts as the desired external energy storage device voltage. The desired external energy storage device voltage may be based on battery chemistry (e.g., lead-acid), number of battery cells, battery temperature, and other conditions. The desired external energy storage device voltage may be stored in memory during manufacturing or it may be input via a user interface. Method 900 proceeds to 961 after the desired external energy storage device voltage is determined.

At 961, method 900 judges if the external electrical energy storage device voltage is greater than a first threshold voltage. In one example, the first threshold voltage is an open circuit voltage of the external electrical energy storage device when the external electrical energy storage device is at 100% SOC, but below a float voltage limit of a battery charger. A voltage of the external electrical energy storage device being greater than the first threshold voltage may be indicative of a condition desirable for charging the add-on battery system battery. If method 900 judges that the external electrical energy storage device voltage is greater than a first threshold voltage, the answer is yes and method 900 proceeds to 965 of FIG. 15. Otherwise, the answer is no and method 900 proceeds to 962.

At 965, method 900 judges if the add-on battery system battery voltage is greater than the external electrical energy storage device voltage (e.g., battery voltage). In one example, method 900 samples add-on battery system battery voltage and external battery voltage. If the add-on battery system battery voltage is greater than the external energy storage device voltage, the answer is yes and method 900 proceeds to 966. Otherwise, the answer is no and method 900 proceeds to 967.

At 966, method 900 operates the add-on battery system bi-directional DC/DC converter in a boost mode. In boost mode, the lower voltage from the external battery is stepped up so that the add-on battery system battery may be charged using a desired voltage that is greater than the external battery voltage. The desired voltage may be retrieved from memory and H-bridge MOSFET switching times may be adjusted to provide the desired voltage from the external battery to the add-on battery system battery. Table 1 identifies transistor operating states for the transistors of FIG. 4 operating in boost mode transferring charge from the external battery to the add-on battery system battery.

Thus, to operate the H-bridge in a boost mode when add-on battery system battery voltage is greater than external electrical energy storage device voltage, Q is operated in !PWM mode, Q2 is operated in PWM mode, Q3 is operated ON, and Q4 is OFF. In this way, charge may be transferred from the external electrical energy storage device to the add-on battery system battery to recharge the add-on battery system battery or electrical energy storage device. Method 900 exits at FIG. 9 after step 966 completes.

At 967, method 900 operates the add-on battery system bi-directional DC/DC converter in a buck mode. In buck mode, the higher voltage from the external energy storage device is stepped down so that the add-on battery system battery may be charged using a desired voltage that is less than the external energy storage device voltage. The desired voltage may be retrieved from memory and H-bridge MOSFET switching times may be adjusted to provide the desired voltage from the add-on battery system battery to the external battery. Table 1 identifies transistor operating states for the transistors of FIG. 4 operating in buck mode transferring charge from the external energy storage device to the add-on battery system battery.

Thus, to operate the H-bridge in a buck mode when add-on battery system battery voltage is less than external electrical energy storage device voltage, Q1 is ON, Q2 is OFF, Q3 is operated in PWM mode, and Q4 is operated in !PWM mode. In this way, charge may be transferred from the external electrical energy storage device to the add-on battery system battery to recharge the add-on battery system battery or electrical energy storage device. Method 900 exits at FIG. 9 after step 966 completes.

At 962, method 900 judges if the external electrical energy storage device voltage is less than a second threshold voltage. In one example, the second threshold voltage is an open circuit voltage of the external electrical energy storage device when the external electrical energy storage device is a predetermined SOC that provides sufficient charge capacity in the external electrical energy storage device to operate the external load. For example, the second threshold voltage may be a voltage that corresponds to 40% SOC for the external electrical energy storage device. If method 900 judges that the external electrical energy storage device voltage is less than a second threshold voltage, the answer is yes and method 900 proceeds to 965 of FIG. 15. Otherwise, the answer is no and method 900 proceeds to 963.

At 970, method 900 judges if the add-on battery system battery voltage is greater than the external electrical energy storage device voltage (e.g., battery voltage). In one example, method 900 samples add-on battery system battery voltage and external battery voltage. If the add-on battery system battery voltage is greater than the external battery voltage, the answer is yes and method 900 proceeds to 971. Otherwise, the answer is no and method 900 proceeds to 972.

At 971, method 900 operates the add-on battery system bi-directional DC/DC converter in a buck mode. In buck mode, the higher voltage from the add-on battery system battery is stepped down so that the external electrical energy storage device may be charged using a desired voltage that is less than the add-on battery system battery voltage. The desired voltage may be retrieved from memory and H-bridge MOSFET switching times may be adjusted to provide the desired voltage from the add-on battery system battery to the external electrical energy storage device. Table 1 identifies transistor operating states for the transistors of FIG. 4 operating in buck mode transferring charge from the add-on battery system battery to the external battery.

Thus, to operate the H-bridge in a buck mode when add-on battery system battery voltage is greater than external electrical energy storage device voltage, Q1 is operated in PWM mode, Q2 is operated in !PWM mode, Q3 is operated ON, and Q4 is OFF. In this way, charge may be transferred from the add-on battery system to the external electrical energy storage device to extend external electrical energy storage device operation. Further, since the derivative value indicates that the external load is consuming charge, a majority of add-on battery system charge supplied to the external electrical energy storage device is directly transferred to the electrical load that is electrically coupled to the external electrical energy storage device. Consequently, add-on battery system charge may be applied more efficiently as compared to simply charging the external electrical energy storage device. Method 900 proceeds to exit after 971 completes.

At 972, method 900 operates the add-on battery system bi-directional DC/DC converter in a boost mode. In boost mode, the lower voltage from the add-on battery system battery is stepped up so that the external electrical energy storage device may be charged using a desired voltage that is greater than the add-on battery system battery voltage. The desired voltage may be retrieved from memory and H-bridge MOSFET switching times may be adjusted to provide the desired voltage from the add-on battery system battery to the external battery. Table 1 identifies transistor operating states for the transistors of FIG. 4 operating in boost mode transferring charge from the add-on battery system battery to the external battery.

Thus, to operate the H-bridge in a boost mode when add-on battery system battery voltage is less than external electrical energy storage device voltage, Q1 is ON, Q2 is OFF, Q3 is operated in !PWM mode, and Q4 is operated in PWM mode. In this way, charge may be transferred from the add-on battery system to the external electrical energy storage device to extend external electrical energy storage device operation. Further, since the derivative value indicates that the external load is consuming charge, a majority of add-on battery system charge supplied to the external electrical energy storage device is directly transferred to the electrical load that is electrically coupled to the external electrical energy storage device. Consequently, add-on battery system charge may be applied more efficiently as compared to simply charging the external electrical energy storage device. Method 900 proceeds to exit after 972 completes.

At 963, method 900 deactivates the bi-directional DC/DC converter to conserve power in the add-on battery system. The bi-directional DC/(DC converter may be deactivated when the external load is not making demands on the external electrical energy storage device. Further the bi-directional DC/DC converter may be deactivated when the external electrical energy storage device is within a desired range of charge.

It should also be noted that the PWM frequency and duty cycle may be adjusted to provide different voltage or current gains from the bi-directional DC/DC converter. For example, the PWM duty cycle may be adjusted to increase bi-directional DC/DC converter voltage gain proportionately to a difference between external electrical energy storage device voltage and a threshold voltage. Further, the add-on battery system output power may be limited to less than a threshold amount of power so that size of conductors electrically coupling the add-on battery system to the external electrical energy storage device may be desired gauge. Additionally, the bi-directional DC/DC voltage output during the various described modes may be limited to a threshold voltage greater than the present external electrical energy storage device voltage so that fuel meter device operation in the external system may not be interfered by the add-on battery system.

Thus, the method of FIGS. 9-15 provides for an add-on battery operating method, comprising: supplying electrical power from a first electrical energy storage device in a first system to a second electrical energy storage device of a second system in response to an indication of an electric load consuming charge from the second electrical energy storage device, the second system not part of the first system, the electrical power supplied via a bi-directional DC/DC converter in the first system. The method includes where the indication of the electrical load consuming charge is based on a derivative of a voltage of the second electrical energy storage device. The method includes where the indication of the electrical load consuming charge is based on a difference of a rolling average of voltage of the second electrical energy storage device and an instantaneous voltage of the second electrical energy storage device.

In some examples, the method further comprises supplying the electrical power from the first electrical energy storage device to the second electrical energy storage device in response to a voltage of the second electrical energy storage device. The method includes where the electrical power from the first electrical energy storage device is supplied to the second electrical energy storage device in response to the voltage of the second electrical energy storage device being less than a threshold voltage. The method includes where the indication of the electric load consuming charge from the second electrical energy storage device is based on a current sensor in the second system. The method includes where the first system is portable, and where the first system includes a battery having a higher charge density than a battery of the second system.

The method of FIGS. 9-15 also provides for an add-on battery operating method, comprising: in a first mode, supplying electrical power from a first electrical energy storage device in a first system to a second electrical energy storage device of a second system in response to an indication of an electric load consuming charge from the second electrical energy storage device, the second system not part of the first system, the electrical power supplied via a bi-directional DC/DC converter in the first system; and in a second mode, supplying electrical power from the second electrical energy storage device of the second system to the first electrical energy storage device in the first system via the bi-directional DC/DC converter in response to an indication the second electrical energy storage device is charged to a level greater than a threshold level.

In some examples, the method includes where the indication of electric load consuming charge from the second electrical energy storage device is based on a voltage of the second electrical energy storage device. The method includes where the indication of electric load consuming charge from the second electrical energy storage device is further based on a derivative of the voltage of the second electrical energy storage device. The method includes where the indication of electric load consuming charge from the second electrical energy storage device is further based on a rolling average of the voltage of the second electrical energy storage device. The method further comprises supplying electrical power from the second electrical energy storage device of the second system to the first electrical energy storage device in the first system in response to a derivative of a voltage of the second electrical energy storage device.

Note that the example control and estimation routines included herein can be applied to various add-on battery system configurations. The control methods and routines disclosed herein may be stored as executable instructions in non-transitory memory and may be carried out by the control system including the controller in combination with the various sensors, actuators, and other hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the control system, where the described actions are carried out by executing the instructions in a system including the various hardware components in combination with the electronic controller This concludes the description. The reading of it by those skilled in the art would bring to mind many alterations and modifications without departing from the spirit and the scope of the description. For example, the add-on battery system may be applied to battery powered systems that may rely on a variety of different battery chemistries.

The invention claimed is:

1. An add-on battery system, comprising:

a battery;

a bi-directional DC/DC converter including an H-bridge comprising a transformer positioned in a horizontal circuit extending between two vertical circuits, a first of the two vertical circuits including two transistors and a second of the two vertical circuits including two additional transistors;

a controller including instructions stored in non-transitory memory to direct current flow into the battery and out of the battery via the bi-directional DC/DC converter in response to conditions of an external electrical energy storage device; and additional instructions to activate the bi-directional DC/DC converter in response to a derivative of a voltage of the external electrical energy storage device.

2. The add-on battery system of claim 1, further comprising:

additional instructions to activate the bi-directional DC/DC converter in response to an error between a rolling average of a voltage of the external electrical energy storage device and an instantaneous voltage of the external electrical energy storage device.

3. The add-on battery system of claim 1, further comprising:

two operational amplifiers and an inductor, the two operational amplifiers and the inductor directly coupled to the transformer.

4. The add-on battery system of claim 3, where the inductor is positioned in the horizontal circuit between the transformer and the two additional transistors in the second vertical circuits.

5. The add-on battery system of claim 4, where the transformer includes two windings, where a first of the two windings is coupled to the two operational amplifiers, and where a second of the two windings is coupled to the inductor and the two transistors in the first vertical circuit.

6. The add-on battery system of claim 1, further comprising:

additional instructions to deactivate the bi-directional DC/DC converter in response to a voltage of the external electrical energy storage device being less than a first threshold and being greater than a second threshold.

7. The add-on battery system of claim 6, further comprising:

additional instructions to activate the bi-directional DC/DC converter in response to the voltage of the external electrical energy storage device being greater than the first threshold and being less than the second threshold.

8. An add-on battery system, comprising:

a battery;

a bi-directional DC/DC converter including an H-bridge comprising a transformer positioned in a horizontal circuit extending between two vertical circuits;

a controller including instructions stored in non-transitory memory to direct current flow into the battery and out of the battery via the bi-directional DC/DC converter in response to conditions of an external electrical energy storage device; and additional instructions to activate the bi-directional DC/DC converter in response to a derivative of a voltage of the external electrical energy storage device.

9. The add-on battery system of claim 8, further comprising:

additional instructions to activate the bi-directional DC/DC converter in response to an error between a rolling average of a voltage of the external electrical energy storage device and an instantaneous voltage of the external electrical energy storage device.

10. The add-on battery system of claim 8, where the bi-directional DC/DC converter includes an H-bridge comprising a transformer positioned in a horizontal circuit extending between two vertical circuits.

11. The add-on battery system of claim 10, where the two vertical circuits are comprised of metal oxide semiconductor field effect transistors.

12. The add-on battery system of claim 11, where the horizontal circuit further comprises an inductor.

13. The add-on battery system of claim 8, further comprising:

additional instructions to deactivate the bi-directional DC/DC converter in response to a voltage of the external electrical energy storage device being less than a first threshold and being greater than a second threshold.

14. The add-on battery system of claim 13, further comprising:

additional instructions to activate the bi-directional DC/DC converter in response to the voltage of the external electrical energy storage device being greater than the first threshold and being less than the second threshold.

15. An add-on battery operating method, comprising:

supplying electrical power from a first electrical energy storage device in a first system to a second electrical energy storage device in a second system in response to electric current being supplied from the second electrical energy storage device to an external load, the second system not part of the first system, the electrical power supplied via a bi-directional DC/DC converter in the first system;

supplying the electrical power from the first electrical energy storage device to the second electrical energy storage device in response to a voltage of the second electrical energy storage device; and activating the bi-directional DC/DC converter in response to a derivative of a voltage of the second electrical energy storage device.

16. The method of claim 15, further comprising:

operating the bi-directional DC/DC converter in a buck mode in response to a voltage of the first electrical energy storage device being greater than a voltage of the second electrical energy storage device, where a first, a second, and a third of four transistors of an H-bridge in the bi-directional DC/DC converter operate in the buck mode and where a fourth of the four transistors in the H-bridge does not operate in the buck mode.

17. The method of claim 16, further comprising:

operating the bi-directional DC/DC converter in a boost mode in response to the voltage of the first electrical energy storage device being less than the voltage of the second electrical energy storage device, where the second of the four transistors of the H-bridge in the bi-directional DC/DC converter does not operate in the boost mode and where the first, the third, and the fourth of the four transistors in the H-bridge operate in the boost mode.

18. The method of claim 15, where the electrical power from the first electrical energy storage device is supplied to the second electrical energy storage device in response to the voltage of the second electrical energy storage device being less than a threshold voltage.

* * * * *